Sept. 19, 1933.  M. L. NELSON  1,927,556
AUTOMATIC AUDITING AND MERCHANDISE CONTROL SYSTEM
Filed May 23, 1930  12 Sheets-Sheet 5
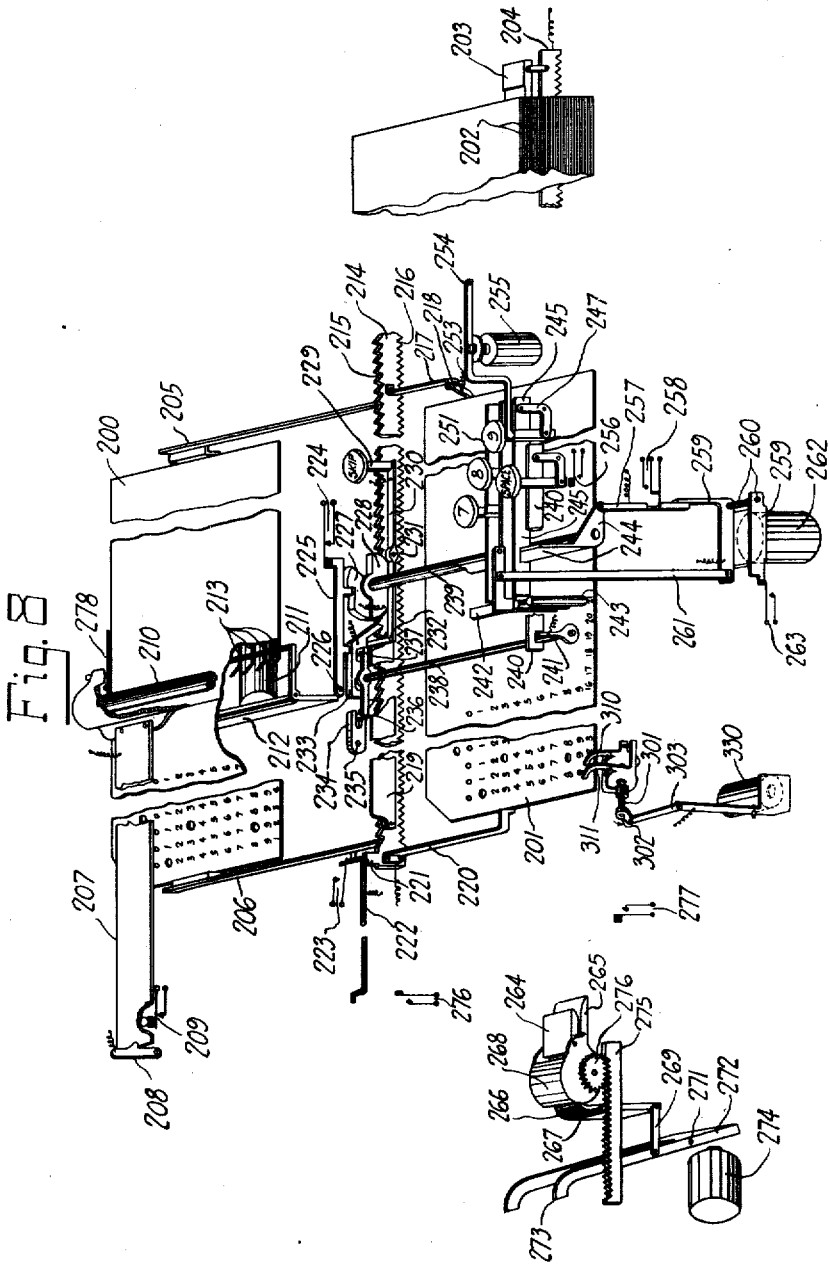

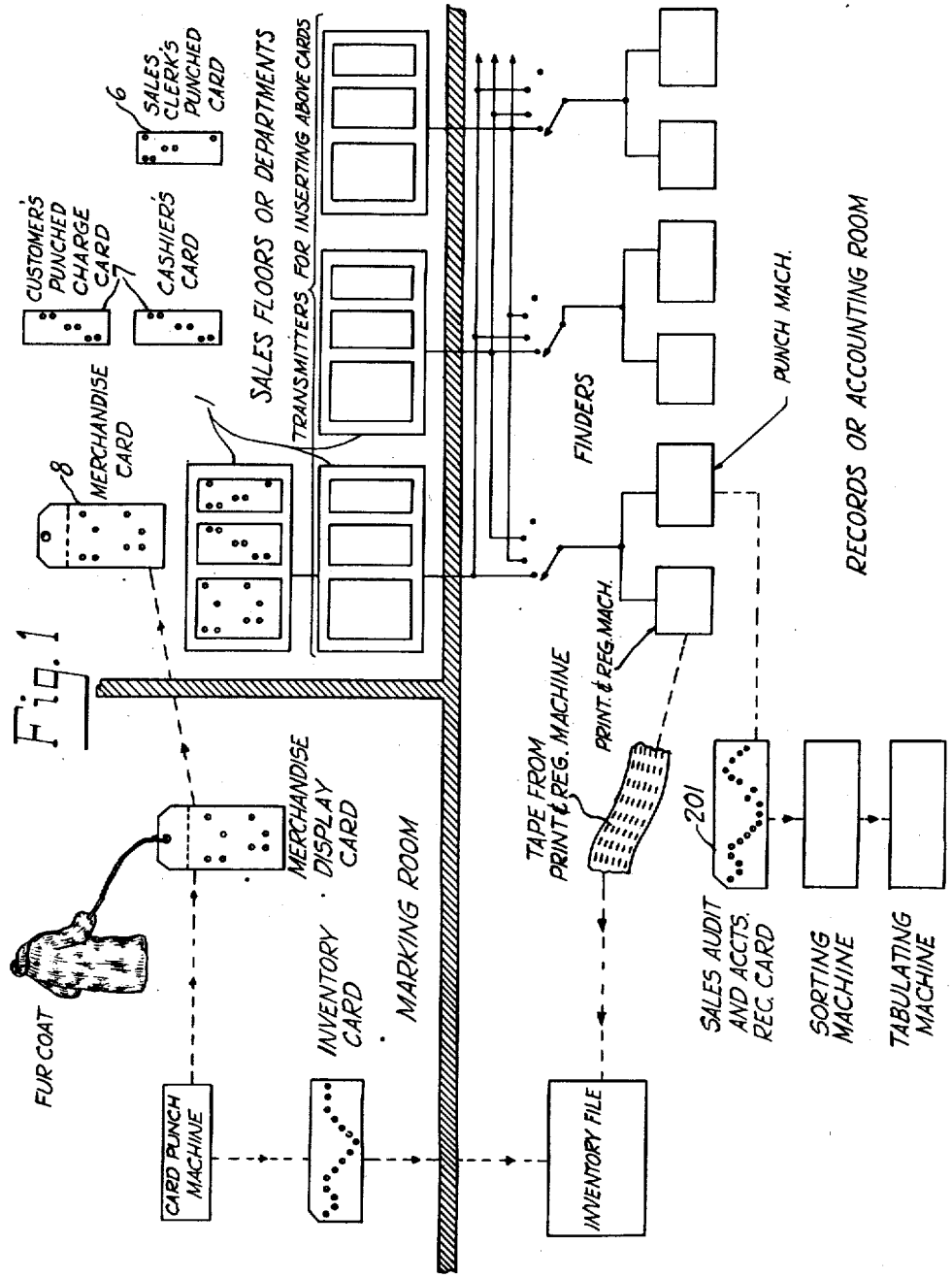

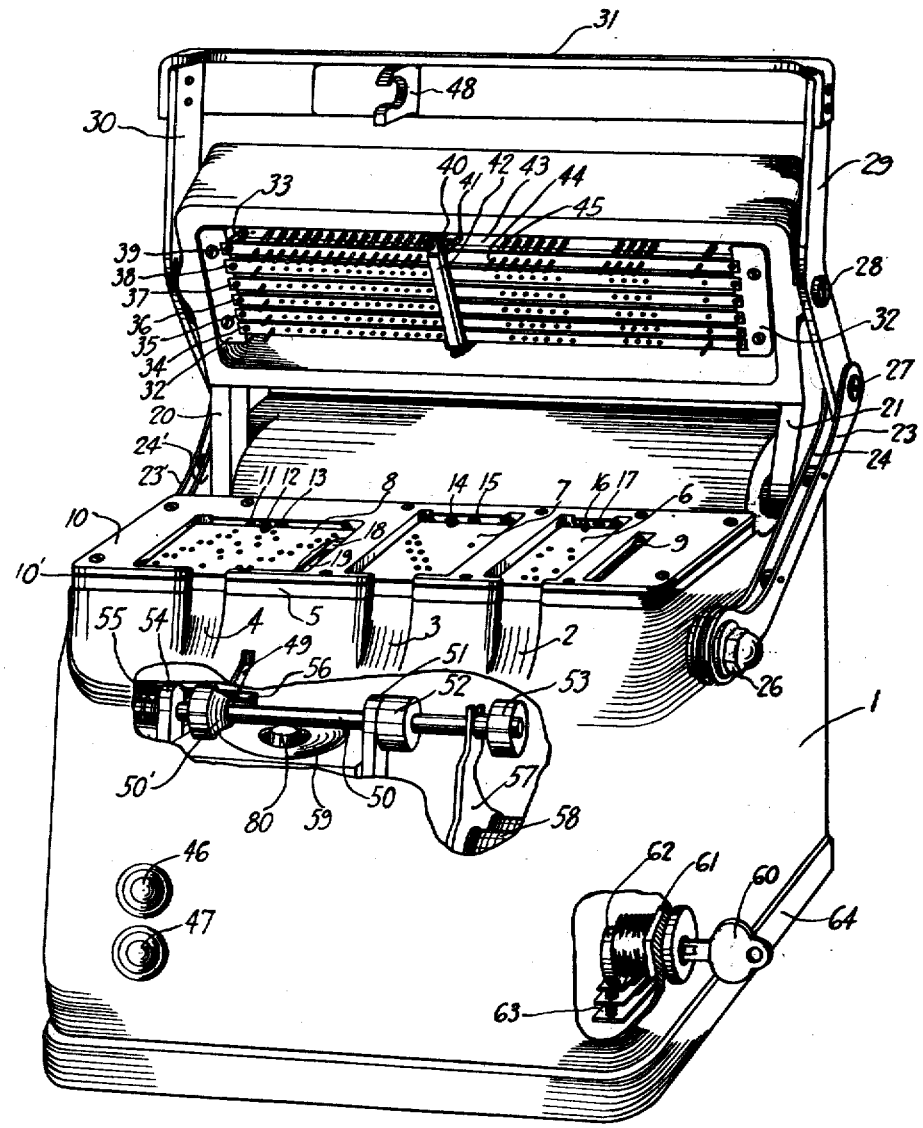

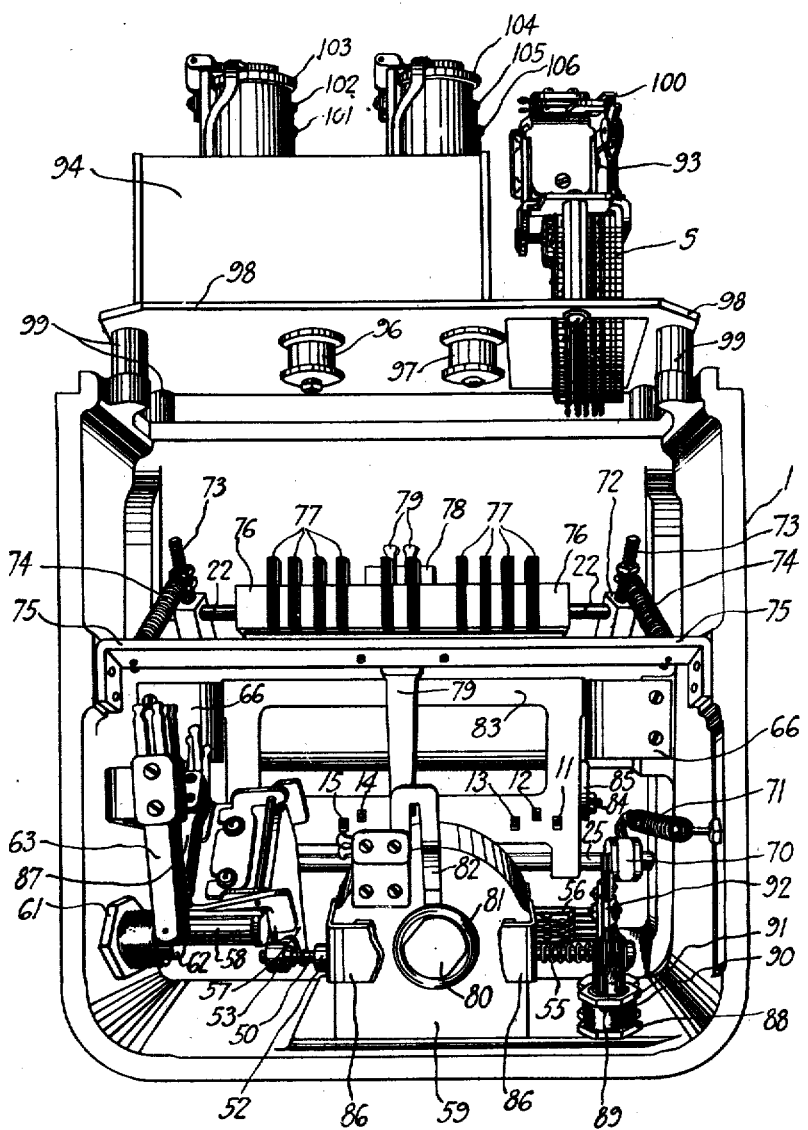

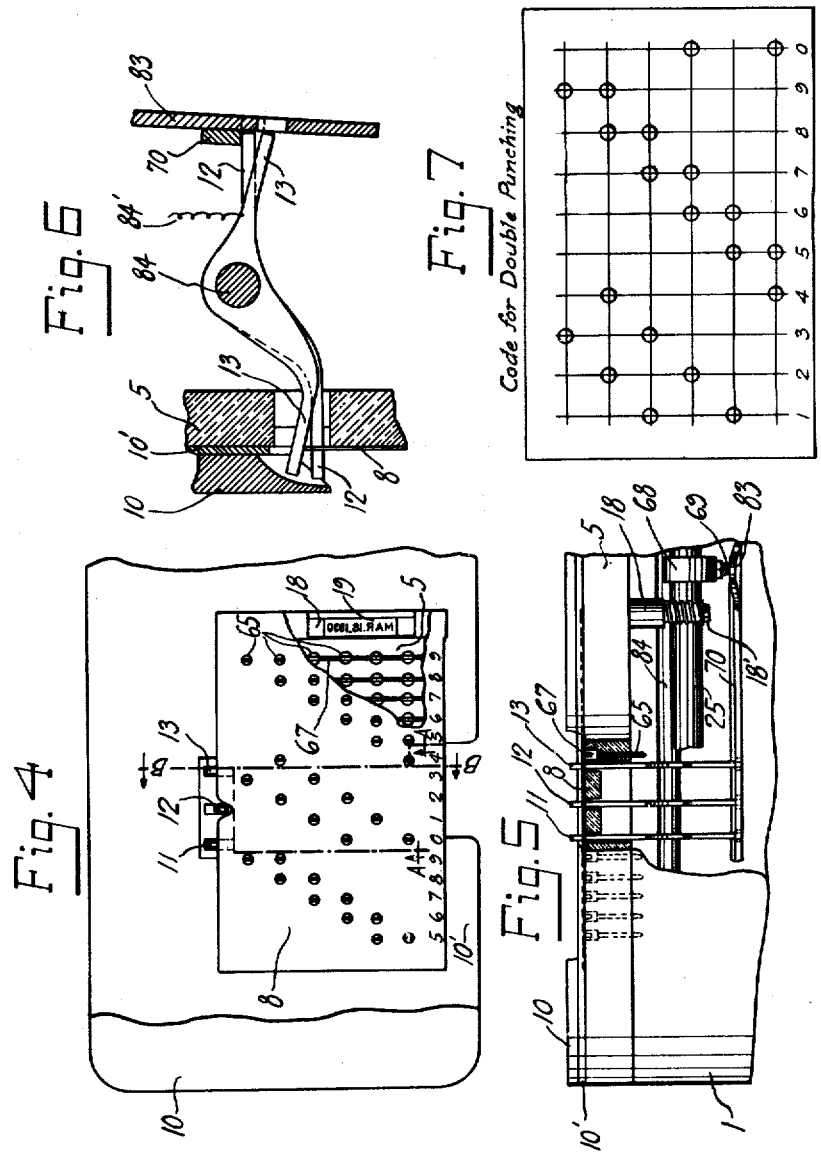

Sept. 19, 1933.　　　　M. L. NELSON　　　　1,927,556
AUTOMATIC AUDITING AND MERCHANDISE CONTROL SYSTEM
Filed May 23, 1930　　　12 Sheets-Sheet 6
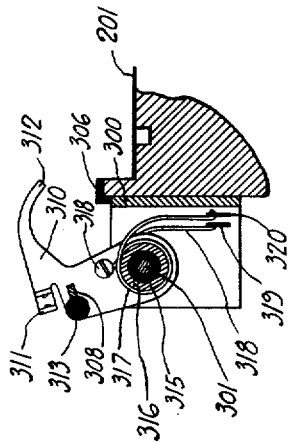
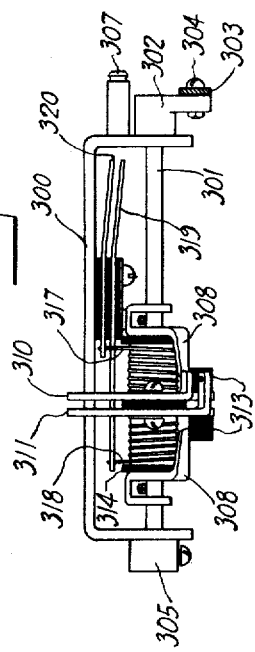
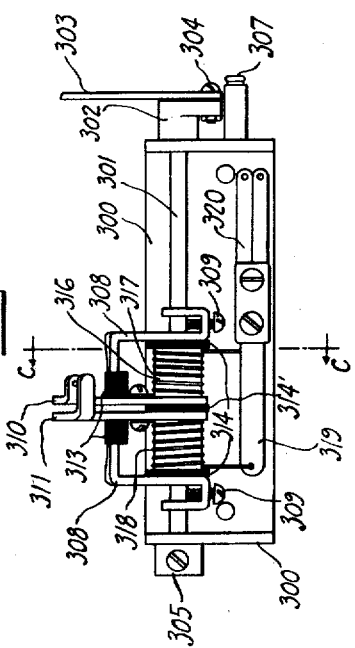
*Inventor*
Martin L. Nelson
Wm Walter Owen Atty.

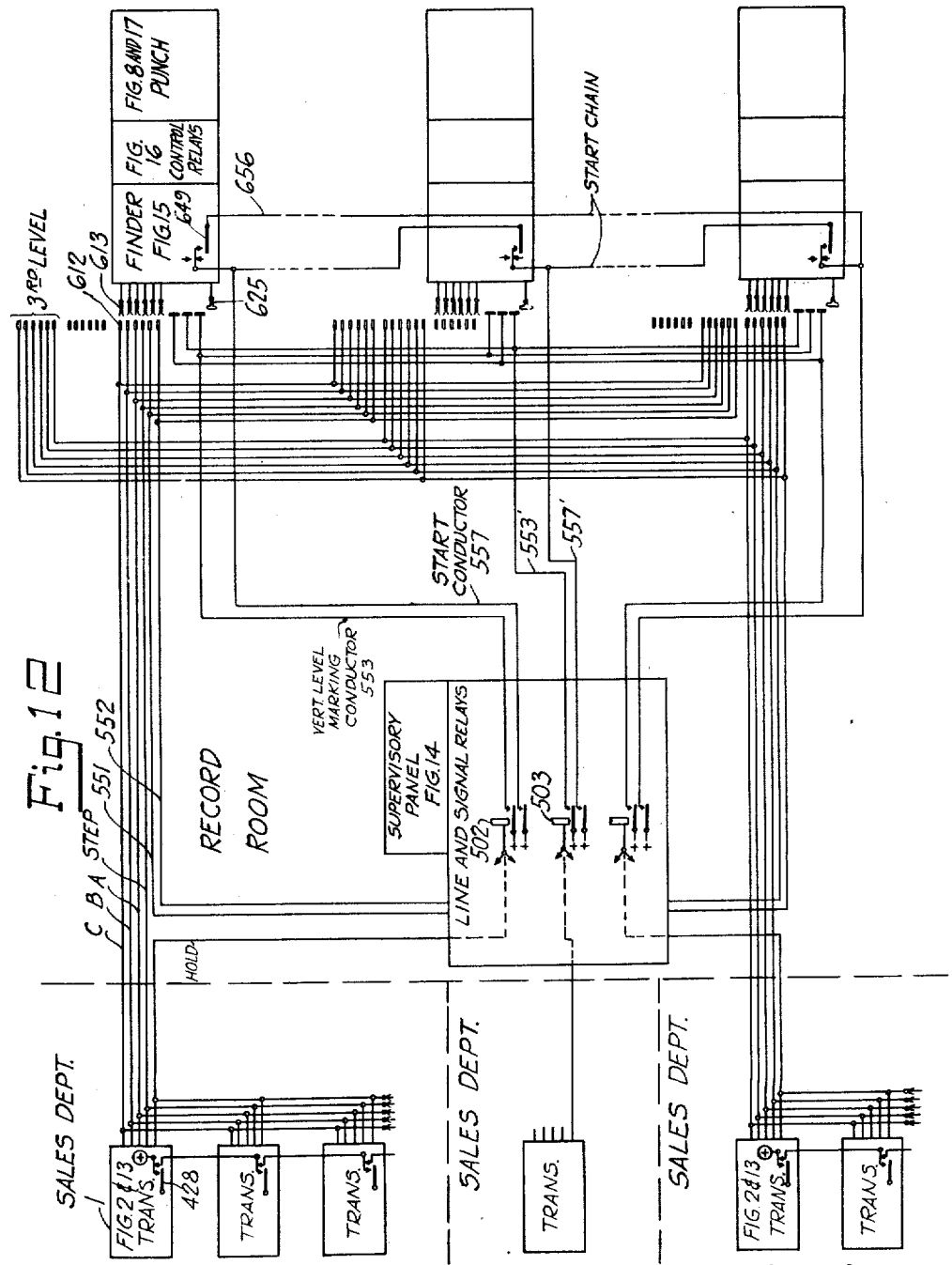

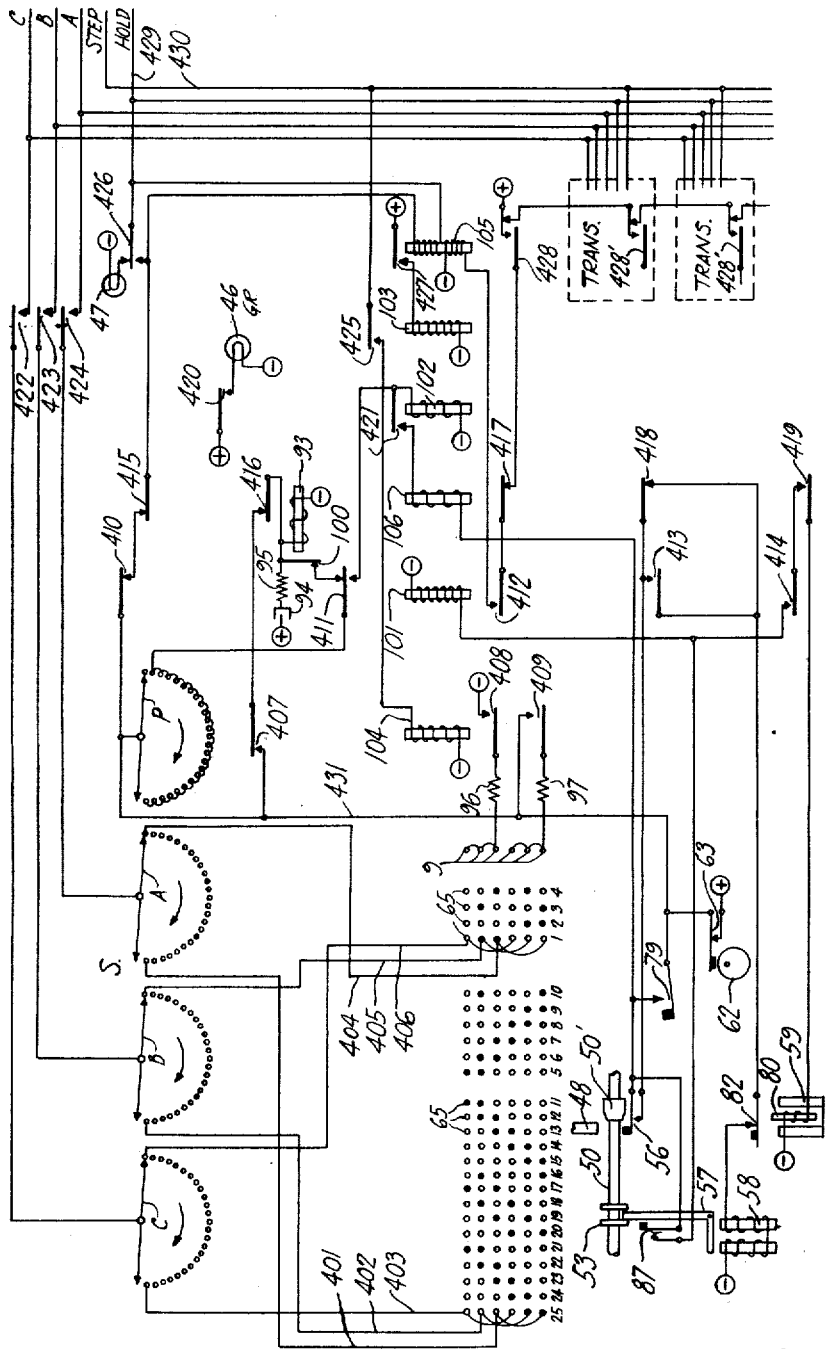

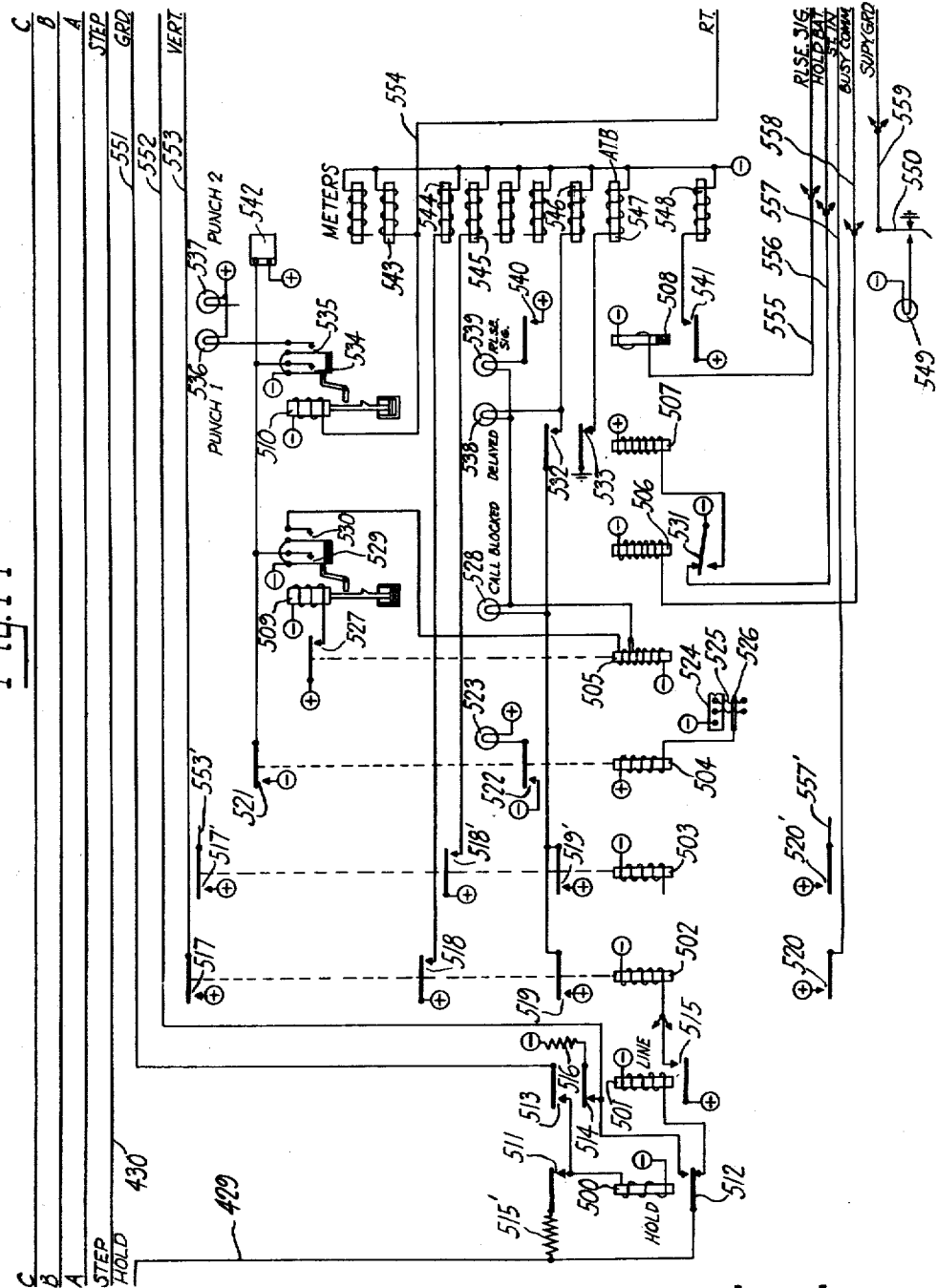

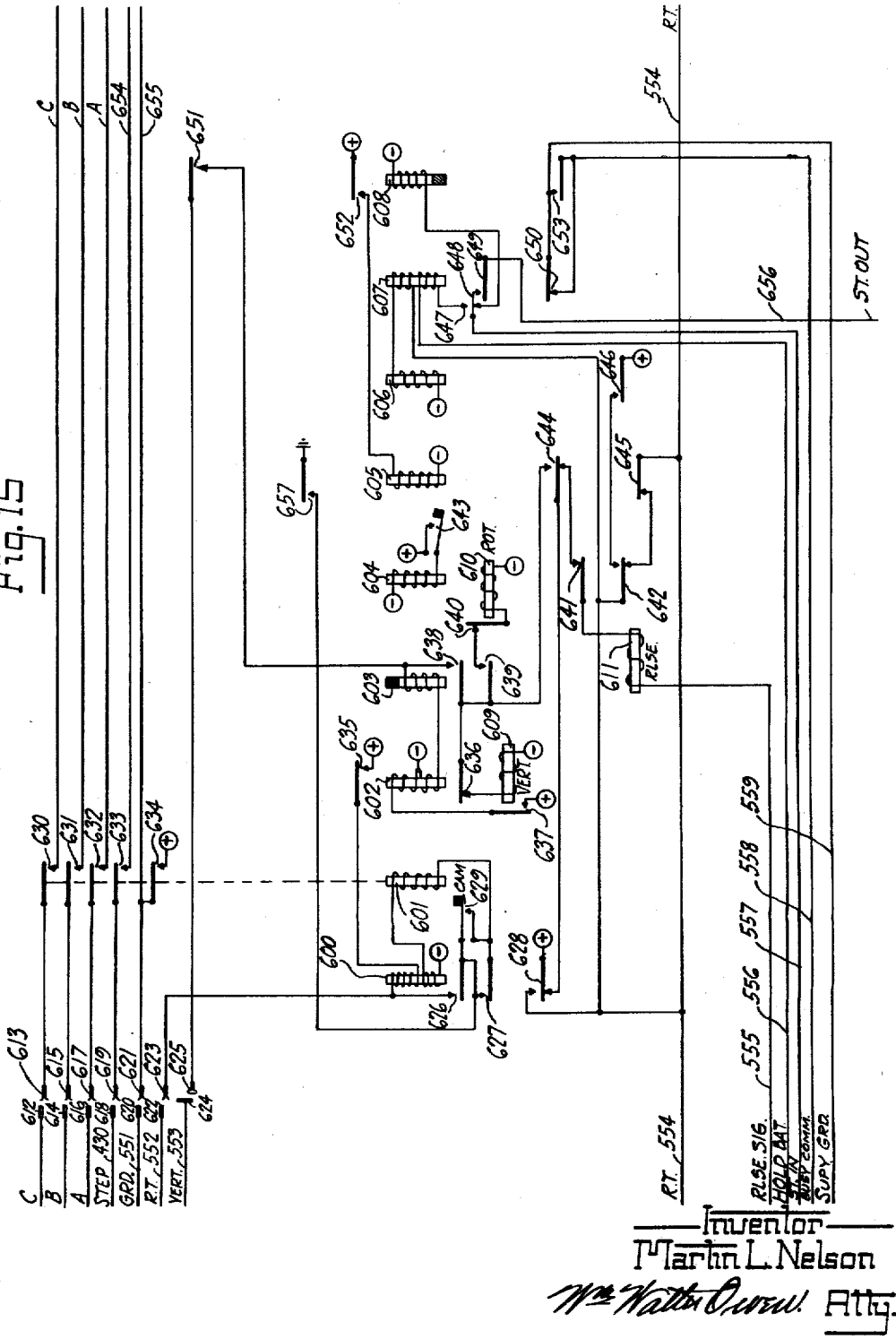

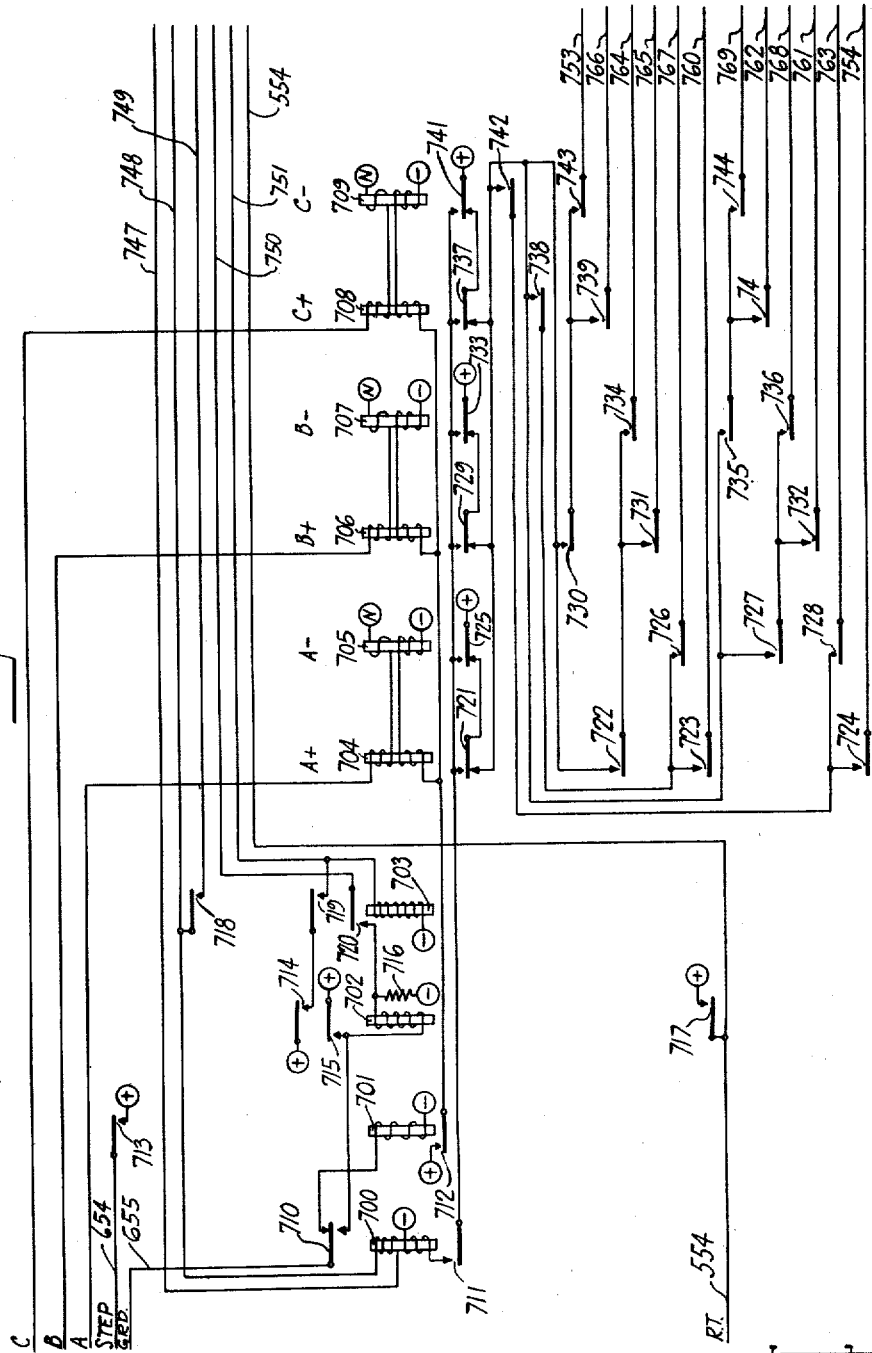

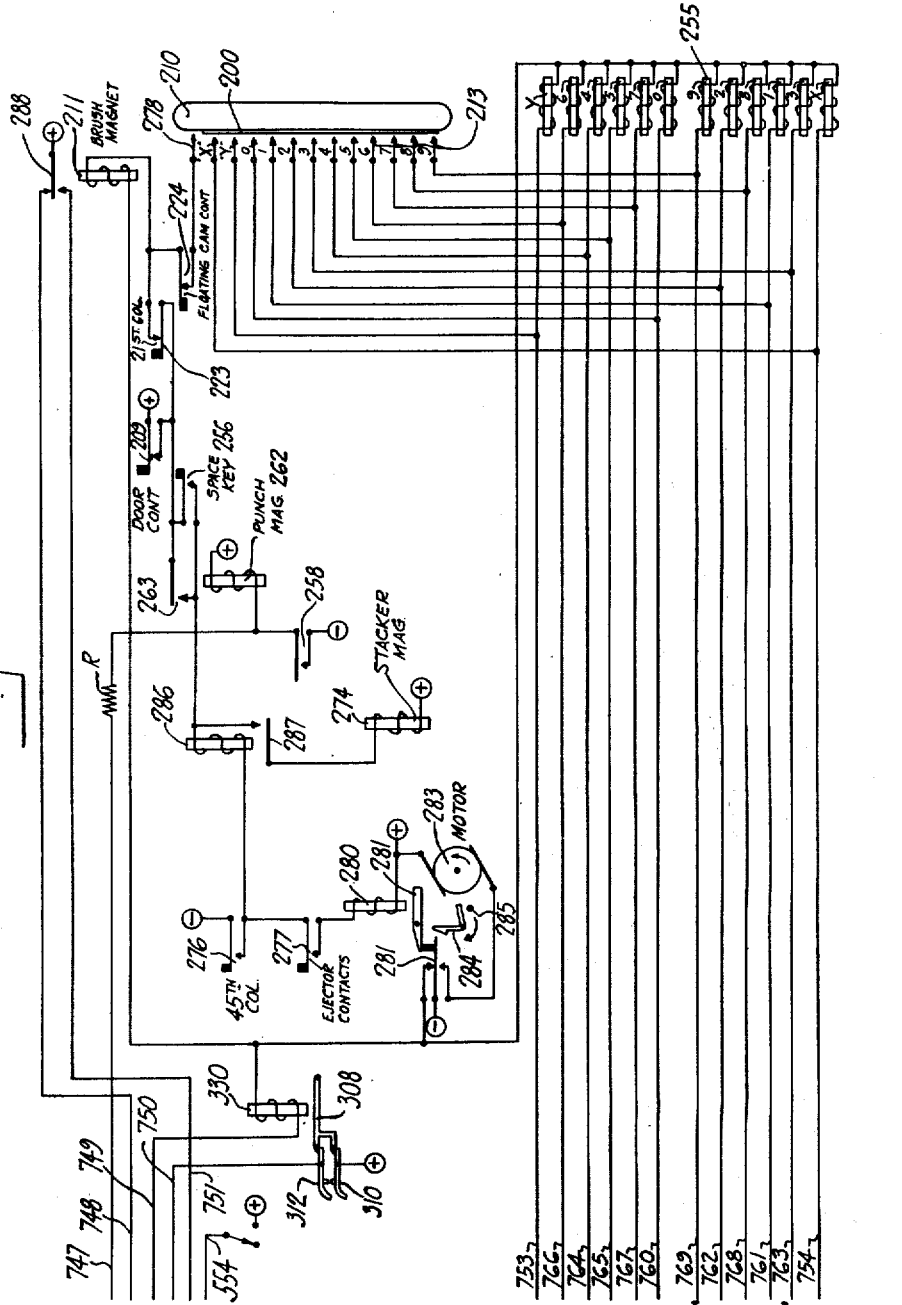

Patented Sept. 19, 1933

1,927,556

UNITED STATES PATENT OFFICE 1,927,556

AUTOMATIC AUDITING AND MERCHANDISE CONTROL SYSTEM

Martin L. Nelson, Park Ridge, Ill., assignor, by mesne assignments, to Associated Electric Laboratories, Inc., Chicago, Ill., a corporation of Delaware Application May 23, 1930. Serial No. 454,885

49 Claims. (Cl. 178—2)

The present invention relates to an auditing and merchandise control system for use in department stores or other places where merchandise is sold.

The system disclosed in the present application may be considered as an improvement on my copending application, Serial No. 275,643, filed May 7, 1928.

The object of the above type of system is to automatically record the sale of articles in the various departments or sale floors of a department store at a centrally-located accounting or auditing room. The routine for recording a sale is very simple. When a sales person makes a sale, she removes a merchandise sales or display card from the article of merchandise and gives such card to the cashier. The card is inserted into a transmitter together with other identification cards such as a cashier's card and the sales person's card. These cards have been perforated in accordance with certain information which is now automatically transmitted to the record room. The information transmitted to the record room causes a new card to be perforated in accordance with the perforations in the three cards in the transmitter. A complete record of the sale is, therefore, made, in the record room, at the time of the sale.

One of the features relates to an improved mechanical and electrical transmitter having improved locking, printing, and card-checking means. The transmitter is made complete in itself so that it may be readily connected or disconnected from any transmitter line. The circuits of the transmitter are so arranged that more than one transmitter may be on the same transmitter line without interfering with the operation of any other transmitter on the same line.

Another feature relates to the finder-punch links each including a group of control relays for controlling the operation of both the punch and transmitter in use.

Another feature relates to the trunking arrangement between the various finder-punch links and the transmitter lines for providing a preferential service.

Another feature relates to the transfer-circuit arrangement in the finders for preventing a finder from stealing a partially-completed call from a second finder when the first finder is released, and for maintaining the finder non-selectable in case a card is improperly inserted in the punch, and in case the punch is out of order.

Another feature relates to the mechanical and electric circuits for checking the position of a card in the punch.

Another feature relates to the provision of a supervisory arrangement in a system of this type for operating trouble signals and for metering calls.

The foregoing and further features, not specifically mentioned, will be described more in detail by referring to the accompanying drawings comprising Figs. 1 to 17, inclusive.

Fig. 1 diagrammatically illustrates the general layout of the complete merchandise control system.

Fig. 2 shows a perspective front view of the transmitting device with some parts broken away to show the interior mechanism more clearly.

Fig. 3 is a perspective view looking from the bottom of the transmitting device showing the details of the interior mechanism more fully.

Fig. 4 is a top view of a portion of the transmitting device showing certain details more clearly.

Fig. 5 is a side elevation of Fig. 4 on the rectangular cross-section line AA.

Fig. 6 is an end view of Fig. 4 on the cross-section line BB, showing more clearly the details of the card-check arrangement.

Fig. 7 is a chart showing the double-code punchings for all of the numerals from 1 to 10.

Fig. 8 shows a perspective schematic view of the motor-driven duplicating key punch.

Figs. 9 and 10 show a top and side view, respectively, of a card check arrangement added to the punch shown in Fig. 8.

Fig. 11 shows a detailed end view of the card check on the cross-section line CC in Fig. 10.

Fig. 12 is a schematic wiring diagram showing the trunking arrangement and the location of the various pieces of apparatus in the department store.

Fig. 13 shows the detailed circuits of the transmitting device disclosed mechanically in Figs. 2 and 3.

Fig. 14 shows a part of the line relays and supervisory equipment.

Fig. 15 shows a two-motion finder of the well-known Strowger type of switch. This finder has access to the transmitter shown in Fig. 13 as well as other transmitters such as indicated in Fig. 12.

Fig. 16 shows a group of control relays individual to the finder shown in Fig. 15 and is used for translating the code sent by the transmitter shown in Fig. 13, from a double-punching code to a single code to control the punch shown in Fig. 8 and Fig. 17.

Fig. 17 shows the circuit details of the punch shown mechanically in Fig. 8 and is individual to the finder shown in Fig. 15 and the control relays shown in Fig. 16.

The current supply to the various magnets and relays shown in the drawings, is indicated by the usual symbol in circles, designating the negative and positive poles of a battery. It will be understood that a plurality of current sources has been shown by these symbols merely for the sake of conveniently describing the apparatus and its operation; in reality, only one battery is used, which is tapped at the mid-point. This mid-point tap is designated in the drawings by the reference character N set in a circle. The negative pole of battery will be referred to as "battery", and the positive pole will be referred to as "ground".

Throughout the drawings similar parts are marked with similar reference characters.

Referring now to Fig. 1, a brief description of the procedure and operation will now be given.

Each article of merchandise to be sold has an inventory card and a merchandise display card punched in accordance with certain information. The inventory card is single punched with the serial number of the article, its cost price, its size, file, purchase date, and other necessary information, while the merchandise display card is double punched in code, in accordance with the serial number of the article, its size, number, sales price, and department number. The inventory card is then placed in the inventory file, while the merchandise display card acompanies the merchandise article to the proper sales department. This procedure is diagrammatically illustrated in the upper left-hand corner of Fig. 1.

Each sales clerk and each cashier have identification cards double punched in code with their store number, and each customer having a charge account has a similar code-punched indentification card.

When a sale is made, the merchandise card of the article sold, the clerk's card, and the cashier's card in case it is a cash sale, or the charge customer's card in case it is a charge sale, are placed in the transmitter, and when the transmitter is operated, a finder switch automatically hunts for and finds the calling transmitter line upon which the particular transmitter in use is connected to. The finder switch is individual to a printing and registering machine and also individual to a card-punching machine. The transmitter is now operated to successively close the circuit connections made through the perforated holes in the cards in the transmitter, to cause the punch to punch a new card and to cause the printing and registering machine to print the information corresponding to the punched holes of the cards in the transmitter. The printed record is printed on a tape which is used to deplete the inventory file by removing the inventory cards corresponding to the printed record. The new card punched by the punch machine is termed a "sales audit and accounts receivable card" and is then run through a sorting and tabulating machine for determining any specific data desired.

Referring now specifically to Fig. 2, the transmitter comprises a stationary casing 1, which carries an insulating plate 5 made of suitable insulating material such as bakelite and cast into it are a plurality of pins, such as pins 65 shown in detail in Figs. 4 and 5. In Fig. 2 the cards 6, 7, and 8 hide the majority of the pins 65 except where holes have been perforated in said cards. Fastened to the top of the casing 1, are plates 10 and 10' which have openings corresponding to the openings in which the cards 6, 7, and 8 are placed. Below each of the cards 6, 7, and 8 are located the various groups of pins, such as 65, for a purpose which will be explained later. The casing is also provided with notches 2, 3, and 4, for providing a convenient means for removing the cards from the openings shown.

Near the rear of the plate 10 is a slanting flange having openings therein to permit the movement of levers 11 to 17, inclusive, to be moved by the cards 6, 7, and 8 when the same are placed in their respective openings. This arrangement is more fully shown in Fig. 6 and will be described in detail later on.

The row of individual contacts 9 has the purpose of establishing connections for the various combinations set up by the perforations in the cards in cooperation with the movable contacts provided in the companion casing rotatably pivoted on shaft 22.

Referring now to the companion casing, it will be seen that the same is pivoted by means of projections 20 and 21 on shaft 22 (shown in Fig. 3) which is loosely mounted in the stationary casing 1. A shaft 25 (shown more fully in Fig. 3) extends through the stationary casing 1 and projects on both sides where it receives the arms 23, 24, 23', and 24'. These arms are attached to the shaft 25 by means of washers and the nuts, such as nut 26. The arms 23, 24, 23', and 24' are movably attached to the operating levers 29 and 30 which in turn are rotatably fastened to the companion casing by means of screws such as screw 28. A handle 31 is provided for operating the companion casing into connection with the stationary casing.

Mounted in the companion casing are two strips of insulating material 32 and 33. These strips support six metal strips 34 to 39, inclusive. Each of these metal strips has a companion metal strip, such as the one designated by numeral 43 which is individual to the metal strip 39. Between these various pairs of metal strips are mounted individually movable contact pins 44, each of which is provided with a shoulder which rests against its lower metal strip and which is held in normal position by means of a spring, such as spring 45. Only a few of these pins are shown in order to keep the drawing as clear as possible.

It will be seen that the contact pins in the companion casing are arranged in groups and adapted to make contact with the oppositely-located pins in the stationary casing 1 wherever the perforations in the various cards permit the same to take place.

A portion of the card 8 has been cut away to show the metal type 19 and the metal casing 18 for holding the same. Opposite the printing type 19, in the companion casing, is shown a metal strip 42 which is mounted on an insulating strip 41 and insulating lugs 40. This metal strip is provided as a stop so that when the solenoid 59 operates its plunger 80 to strike the print type 19, the plate 42 acts as a stop so that the ticket 8 may be printed with date upon which the sale was made.

It will be noted that each of the cards 6, 7, and 8, is provided with a groove into which the levers 16, 14, and 12 fit when the cards are placed correctly into the openings provided. The reason for providing the levers such as levers 11 to 17, inclusive, together with the grooves in the cards 6, 7, and 8, will be explained more fully in the description of Figs. 4, 5, and 6.

Attached to the handle 31 is a combined cam and collar lug which slides through the opening 49 when the rotatable companion casing is rotated to its operated position. In the cut-away portion of Fig. 1 is shown a shaft 50 which is slidably mounted in lugs 54 and 51 and which is held in the position shown by the coil spring 55 and the collar 52. On the right end of the shaft 50 is attached the collar 53, which causes the shaft 50 to slide to the right when the magnet 58 operates its armature 57. As the locking lug 48 passes through the opening 49, the lug 48 operates the spring assembly 56 to close certain electrical circuits to be described later on. After the companion casing is closed in operated position and the magnet 58 is operated to slide the shaft to the right, the sloping portion of collar 50' slides into the enlarged opening of the locking lug 48 to lock the companion casing in operated position until the magnet 58 is deenergized to permit the coiled spring 55 to slide the shaft 50 to the left back to its normal position. It will be understood that the small opening on the locking lug 48 is just wide enough to slide over the shaft 50, but not large enough to permit the release of the companion casing when the shaft 50 is operated to the right by magnet 58.

The lamps 46 and 47 are provided for indicating to the cashier or the person operating the transmitter, whether the cards 6, 7, and 8 have been placed correctly therein, and whether the transmitter is being operated to transmit the code to the recording room.

An ordinary lock and key 60 has been provided for locking the transmitter out of use. The lock is held to the casing by the lock washers and lock nut 61, and the key 60 in turn operates a cam 62 to control the spring assembly 63 to open or close electrical circuits as desired.

The base 64 is provided with female jacks (not shown) into which the male jacks 77, shown in Fig. 3, slip when the casing 1 is positioned on the base 64. This provision is made so that the jacks in the base 64 may be left permanently wired while the apparatus mounted in the casing 1 may be removed and easily replaced.

Referring now to Fig. 3, the locking mechanism including the lock washer 61, the cam 62, and the spring assembly 63 is more fully shown. Magnet 58 together with its armature 57 for controlling the shaft 50 is shown a little more in full. Magnet 58 is provided with a spring assembly 87 which is operated by an extension of the armature 57. The solenoid 59 is also shown and is mounted to the casing 1 by means of screws. The solenoid 59 is provided with a back-stop bracket 86 for limiting the return movement of the plunger 80. A leather or fiber strip 81 is provided on the plunger 80 for operating the spring assembly 82. Another view of the spring assembly 56 is shown just to the right of the solenoid 59 as well as the coil spring 55 which maintains the rod 50 in its normal position. At 90 is shown the lamp assembly for the lamp 47 which comprises the lock washers 88 and 91, the lock washer 88 for locking the lamp assembly in the casing 1, and the lock washer 91 for locking a shoulder on the lamp spring assembly in place in the manner shown. The lamp assembly of the lamp 46 is shown just to the rear and is similar in all respects to the one just described. The lamp springs 92 comprise the usual spring assembly such as is used in manual telephone switchboards.

At 22 and 25 are shown the two shafts which permit the companion movable casing to be rotated down into engagement with the stationary casing. Attached to the shaft 25 is a coil spring 71 and attached to the shaft 22 are coil springs 74 for maintaining the companion casing in the position shown in Fig. 2 when the companion casing is not locked in operated position.

A plate 83, rotatably mounted on the bracket 66, has holes therein through which the levers 11, 12, 13, 14, and 15 are visible providing the cards 7 and 8 have been properly inserted. On the bracket 85 is mounted a shaft 84 on which the levers 11, 12, 13, 14, and 15, as well as levers 16 and 17, are rotatably mounted.

A mounting plate 98 is attached to the stationary casing by means of screws and collars 99. Mounted on the plate 98 are the condenser 94, resistance coils 96 and 97 and relays 101 to 106, inclusive. Mounted on the right-hand side of the plate 98 is the switch S comprising the motor magnet 93, its interrupter springs 100 together with its operating pawl, and its semi-circular bank contacts. A cover (not shown) is provided for covering the relays and the switch S. The relays 101 to 106, inclusive, operate and control springs not shown.

Referring now to Figs. 4, 5, and 6, a more detailed description will now be given of the apparatus shown therein. These figures show the card 8, with a portion of the same cut away, placed in the opening in the transmitter provided therefor. A groove 67 is cut in the various pins 65 as well as in the insulating plate 5. This groove is cut in this manner so that the various pins 44 will make a better contact when the same pass through the holes in the cards. As shown, the card 8 has a groove cut therein into which the lever 12 fits. When the card 8 is placed in its opening correctly, as shown, the card 8 will force the levers 11 and 13 from the lower part of their associated openings in the plate 5 to the upper part as shown, while the groove in the card will permit the lever 12 to remain in the position shown. As shown in Fig. 5, the levers 12 and 13 are rotatably mounted on the shaft 84 and are normally held against the back-stop 70 by springs 84' as shown in Fig. 6. In case the card 8 should be inserted incorrectly, the levers 11, 12, and 13, would be rotated on the shaft 84 out of alignment with their holes provided in the plate 83. Under these conditions, when the companion movable casing is closed and the shaft 25 is rotated to remove the cam 69 on collars 68 out of engagement with plate 83, any one of the levers 11, 12, and 13, which is moved out of alignment with its associated hole in the plate 83 prevents the spring assembly 79, shown in Fig. 3, from rotating the plate 83. In case the plate 83 does not rotate when the companion casing is closed down on the stationary casing, the contacts 79 do not close to prepare certain circuits which will be explained more fully hereinafter. In case all of the cards 6, 7, and 8, are inserted correctly, all of the levers 11 to 17, inclusive, will be moved in positions opposite openings in the plate 83 so that the spring 79 will rotate the plate and close the aforesaid circuit.

The printing type 19 is suitably mounted in a casing 18 for printing the date of sale on card 8. The plunger 80 of the solenoid 59 strikes the pin 18' to cause the type 19 to print the date of the sale on card 8.

In the code for double punching shown in Fig. 7, the two holes punched in the second and fourth horizontal lines of the first vertical line, indicate the code for the digit 1. In the same manner, the digit 2 is indicated by the holes punched in the third and fifth horizontal lines of the second vertical line. In a like manner the remaining digits 3 to 0, inclusive, are designated by the perforations shown.

Referring now to Fig. 8, the automatic punch shown therein is designed and manufactured by the Tabulating Machine Corporation and is sold by the International Business Machine Corporation. This punch is similar to the punch shown in Patent No. 1,772,186 and is now on the market and is known as the I. B. M. Company's motor-driven duplicating key punch. It should be mentioned that the mechanical features with the exception of the electrical and mechanical card-check arrangement, do not form any part of this invention and therefore only sufficient mechanical details of the punch is shown to enable its operation to be described and understood. The mechanical card check, above mentioned, is shown in detail in Figs. 9, 10, and 11, while Fig. 17 shows the electrical circuits for controlling the punch. The circuits of the punch has been altered somewhat in accordance with the present invention to operate the punch in a manner to be set forth hereinafter. The punch, as designed by the Tabulating Machine Corporation, is used for punching a desired number of cards with the same perforations that are in a master card, such as card 200. The cards are of the well-known type of cards used with tabulating machines and have the usual forty-five vertical columns.

The punch operates in the following manner: A master card having perforations designating the date by day and month, such as card 200, is placed each day on the movable punch carriage, and the door lever 207 is lowered to latch beneath the latch 208. A motor 283 (shown in Fig. 17), when operated, is automatically connected with the bars 214 and 204 to move the carriage and bar 214 to the right to its extreme right-hand position, after which the motor is automatically disengaged. The motor also moves the bar 204 and the card-feed lug 203 to the left to slide the lowermost card of the cards 202 onto the movable carriage, at which time the card is held by the bracket 220 and catch 218 which is mounted on the bracket 217. When the card reaches this position, or its first position with the punch pins 243 over the first vertical column, the motor is automatically disengaged from the bar 204 and a coil spring returns the bar 204 to the positon shown. A coil spring normally tends to return the bar 214 and the carriage to the left, but the same are held in their operated positions by the pawl 233 when the motor is disengaged from the bar 214.

Now when the springs 209 are closed by the locking of door lever 207, brush magnet 211 is energized to operate its armature 212 to cause the brushes 213 to be pressed against the card 200. Certain of the brushes 213 will pass through perforations in the card 200 to make contact with the roller 210 which is always engaged by the brush 278 whenever the brush magnet 211 is energized.

The brushes 213 are each electrically connected to a punch-setting magnet, such as the magnet 255, and complete the circuits therefor whenever said brushes engage the roller 210 through perforations in the master card 200. In this punch there are twelve brushes 213, and twelve corresponding punch-setting magnets, only one (255) of which is shown. When a magnet, such as magnet 255 is energized, it operates its associated armature 253 which is pivoted at 254, to operate the key 251, designating numeral 9. By the operation of key 251, the bell-crank lever 247 causes the bar 245 to slide to the left over its corresponding punch pin, such as pin 243. It will be understood that each of the twelve magnets is provided with an armature, key, and slide bar, similar to the armature 253, key 251, and slide bar 245, provided for magnet 255, and that a corresponding punch pin 243 is also provided for each key and magnet. The bars, such as bars 245, have an opening cut therein into which the upper edge of the plate 244 extends. By the operation of any of these bars, the plate 244 rotates the shaft 239 to in turn rotate the semi-circular cam 228. The rotation of the cam 228 is without effect at this time. However, the rotation of the plate 244 raises the bar 257 to cause an opening therein to operate and close springs 258. The closure of springs 258 closes a circuit for operating the punch magnet 262. Magnet 262 operates its armature 259 to operate the punching mechanism comprising the bar 261 and punch plate 242. In this case, since the bar 245 is the only bar over its corresponding punch pin 243, the punch plate 242, when operated, strikes the bar 245 which in turn strikes the punch pin 243 to perforate the card 201 with a perforation corresponding to the perforation in the master card 200. Armature 259 also operates the bar 257 to the left to cause springs 258 to open the circuit to the punch magnet 262. Another lever (not shown) is controlled by armature 259 to rotate the shaft 238 to an anti-clockwise direction to cause the levers 236 and 237 to operate pawls 234 and 233, respectively. The mechanism associated with the "space" key shows a similar manner for rotating shaft 238 to operate the pawls 234 and 233. That is, when the bar 240 is moved to the left by the operation of the "space" key, the opening in bar 240 engages a lever 241 to rotate the shaft in an anti-clockwise direction. By the rotation of a shaft 238, pawl 233 is lifted out of engagement with the teeth 215, while the pawl 234 is rotated on its pivot 235 to engage the teeth 215 to prevent, at this time, the movement of the carriage and bar 214. When the pawl 233 is lifted out of engagement with the teeth 215, a coil spring moves the pawl to the right in a position to engage the next tooth in bar 214 when shaft 238 is rotated back to normal. The movement of the pawl 233 to the right is permitted due to the elongated openings in the pawl through which the lever 237 and shaft 238 extend. When the pawl 233 is lifted, the upper edge of the pawl engages a lug on bar 225, thereby causing the bar 225 to be rotated on a pivot 226 to open springs 224. When the right-hand lug on bar 225 is raised far enough, the cam 227, which is loosely mounted on cam 228, follows the rotation of cam 228 and therefore is also rotated in an anti-clockwise direction by the coil spring connected to the two cams 227 and 228 to a position such that the right-hand lug of bar 225 will rest on top of the raised portion of cam 227 to maintain the springs 224 open. The springs 224, therefore remain open until the shaft 239 and cams 227 and 228 are rotated in a clockwise direction to normal position by the return operation of a slide bar, such as bar 245, to its normal position. The opening of springs 224 opens the circuit to the brush 278, thereby opening a circuit to any of the punch-setting magnets, such as magnet 255, which were energized through their corresponding brushes 213.

When the operation of armature 259 operated bar 257 to open springs 258, punch magnet 262 deenergizes, thereby releasing armature 259 to permit the shaft 238 to rotate in a clockwise direction back to its normal position. When the shaft 238 rotates to its normal position, the lever 236 lifts the pawl 234 out of engagement with the teeth 215 and the lever 237 permits the pawl 233 to be lowered on top of the next engaging tooth. The carriage and bar 214 are now moved to the left one step by a coil spring (not shown) until the pawl 233 slides to the bottom of the tooth over which it was positioned. The punch plate 242 and bar 261 also return to their normal positions responsive to the deenergization of the punch magnet 262.

When the circuit to the punch-setting magnet is opened at springs 224, in this case magnet 255, the magnet deenergizes to permit a coil spring (not shown) to move the slide bar 245 to the right back to its normal position. The return of the slide bar 245 to its normal position causes the plate 244 and the shaft 239 to rotate to their normal positions. The cam 228 rotates with the shaft 239, thereby causing the cam 227 to be rotated in a clockwise direction until the right-hand lug on bar 225 drops into the cut-away portion of 227 as shown in the drawings. The rotation of 244 back to normal lowers the bar 257 until the spring assembly 258 drops into the opening in bar 257 so that the springs 258 may be closed when the shaft 239 is again rotated by the operation of any one of the punch-setting magnets. All of the mechanisms are now in their normal operating positions, such as shown in the drawings, and the card 201 has been punched in its first vertical column with a perforation corresponding to the perforation in the first vertical column of the master card 200, and such cards, together with the carriage, have been moved one step to the left so that the brushes 213 and punch pins 243 are aligned above the second vertical column on cards 200 and 201, respectively.

As will be seen from the foregoing, the springs 224 do not close until after the carriage has positioned the cards in their next position. When the cards have been moved to their next position and springs 224 close, the circuit for brush 278 is again completed to complete a circuit through the roller 210 and any brush 213 which may be extending through a perforation in the second vertical column of card 200. The punch-setting magnet, corresponding to the brush 213 in electrical connection with roller 210, is energized in the same manner as previously described to punch card 201 and step the carriage and cards to the next position or the position corresponding to the third vertical column on the card. The third and other vertical columns in card 201 are punched in the manner above set forth to duplicate the punchings in card 200.

A removable skip plate 219 is attached to the slide bar 214 for causing the carriage to move a predetermined distance, in this case skip plate 219 is long enough to cause the carriage to move the cards from their fourth position to their twenty-first position, that is, after the card 201 is punched in its fourth vertical column, the skip plate 219 causes the carriage and cards to skip to a position to punch the card 201 in its twenty-first vertical column. It will be understood that other skip plates may be attached to the bar 214 to cause the carriage to skip to any desired position. The operation is as follows: After the card 201 is punched in its third vertical column and the carriage is moved to its fourth position, the skip brush 213 completes a circuit for the skip magnet (not shown), which in turn operates the skip key 229. The operation of the skip key 229 causes the lever 232 to raise pawl 233 and lower pawl 234 in a manner similar to the manner previously described to hold the carriage in the fourth position until the skip hole is punched in card 201. After the card is punched and the carriage starts to move from the fourth position to its fifth position, the upper end of the skip plate 219 engages the lever 232 of the skip key 229 to raise the pawl 233 just far enough so that the pawl will be maintained disengaged from the teeth 215. It should be mentioned, at this time, that the opening in pawl 233, through which the lever 237 extends, is large enough so that the raising of the pawl 233 by the skip plates 219 does not rotate the lever 237 and shaft 238. Since the shaft 238 is not rotated, the pawl 234 is not lowered and the carriage and cards move to the left until the lever 232 is moved beyond the skip plates 219, whereupon the lever 232 is lowered to permit the pawl 233 to again stop the carriage. In the particular embodiment shown in the drawing, the carriage and cards are stopped in their twenty-first position.

When the slide bar 214 and the carriage reach their twenty-first positions, a lug 221 on bar 214 engages an adjustable rod 222 to rotate the same to open springs 223 which heretofore have been closed. The rod 222 is adjustable so that the same may be rotated in any desired position of the carriage to open the springs 223 in such position. When springs 223 are opened, the circuit through the brush magnet 211 and brush 278 is opened so that the operation of the punch-setting magnets, such as 255, are no longer under control of the master card 200. The operation of the carriage and the punching of the card 201 from now on is controlled automatically from a distant point, in accordance with the present invention, by closing electric circuits direct to the punch-setting magnets. Responsive to the operation of the punch-setting magnets, the carriage and cards are advanced step by step until the carriage and cards reach their forty-fifth position. The card 201 being punched automatically as will be more fully described hereinafter.

As the card 201 nears its forty-fifth position, the card 201 passes between the jaws 264 and 265 of the rotatable ejector 268, and after the card has been punched in its forty-fifth position and the carriage attempts to take another step, the springs 276 close and complete a circuit for the stacker magnet 274. The magnet 274 operates its armature 272, which is pivoted at 271, to cause the pawl 266, which is pivoted at 267, to be removed from the catch in the ejector 268. In the ejector 268 is a coil spring (not shown) which causes the ejector to rotate on its axis 276 in an anti-clockwise direction. Since the card 201 is between the jaws 264 and 265, the rotation of the ejector 268 causes the card 201 to be lifted and rotated off of the carriage. The rotation of the ejector 268 also causes the bar 275 to move to the right until it strikes and closes springs 277. The closure of springs 277 closes a circuit for energizing the automatic-feed and trip magnet 280 shown in Fig. 17. Magnet 280 operates its armature 281 to operate spring 281 to close the circuit for operating the motor 283. The motor is operated to engage the bars 204 and 214 to cause the bar 204 to move to the left and the bar 214 to move to the right to its extreme right-hand position, in which position brushes 213 and punch pins 243 are aligned below and above the first vertical column of card 200 and a new card, such as 201. The bar 204 is moved to the left causing the small edge of the feed lug 203 to slide the bottom card of cards 202 onto the carriage until the left-hand edge of the card rests against the bracket 220 and the pawl 218 has dropped behind the right-hand edge of such card. At the same time that the bar 204 was moving a new card on the carriage, the left-hand extremity of bar 204 engages the bar 275 and moves the same to the left.

As soon as the bar 214 is moved to the right by motor 283, springs 276 open the circuits to the stacker magnet 274 and the automatic-feed and trip magnet 280, hereafter called the motor magnet. The circuit to motor 283 is not opened at this time because a catch 284 maintains such circuit closed (Fig. 17). Magnet 274 releases its armature, thereby causing the arms 273 to strike the card 201 out of the jaws 264 and 265 into a card hopper.

Now when the bar 275 is moved to the left, the gears cause the ejector to be rotated in a clockwise direction and to wind up the coil spring therein. When the ejector 268 is rotated back to the position shown in the drawing, the pawl 266 again engages the catch in the ejector to hold it in this position when the bar 204 is returned to its normal position.

When the ejector 268 reaches the position shown in the drawings and the new card is set in its first position, a pin 285 (Fig. 17) on a cam rotated by the motor 283, strikes the catch 284 to release spring 281. The release of spring 281 opens the circuit to motor 283, whereupon the motor is disengaged from the bars 204 and 214. When this takes place, the bar 204 is returned to the right by a coil spring to the position shown in Fig. 8. The pawl 233, as previously described, maintains the carriage in its first position. Now, since the door springs 209 are closed, the punch operates in the manner just described to perforate the new card in its first four vertical columns with duplicate punchings, such as are in the master card 200. After duplicating the punchings of the master card in the new card, the carriage skips to the twenty-first position in the manner previously explained.

When the card 201 and carriage reach their twenty-first position, card-check magnet 330 operates responsive to the deenergization of brush magnet 211 to rotate the contact arms 311 and 310 on the shaft 301 so that the contact arm 310 strikes the card 201. The contact arm 311 rotates on the shaft 301 and just misses the left-hand edge of card 201 provided the same is in its twenty-first position. Arm 311 continues to rotate until it strikes arm 310, whereupon a circuit is completed through the arms 310 and 311 for a purpose which will be more fully explained hereinafter. In case a card, such as 201, was not in its twenty-first position at the time the card-check magnet 330 was operated, then arm 311 would not make contact with arm 310 to complete the circuit above referred to.

The detailed construction of the card-check mechanism, shown in Figs. 9, 10, and 11, will now be described. This card-check assembly is secured to the frame of the punch by means of the bracket 300 and machine screws. A shaft 301 is rotatably mounted in the ends of the bracket 300 and held in place by collars 302 and 305. Loosely mounted on the collar 302, is a lever 303 which is connected to the armature of the card-check magnet 330 shown in Fig. 8. A coil spring (not shown) is fastened to the pin 307 for maintaining the armature of magnet 303 and the arms 310 and 311 in their normal or non-operated positions. Secured to the shaft 301, by means of screws 309, are levers 308. An insulating cylinder or sleeve 315 (shown in Fig. 11), preferably made of fiber, fits over the shaft between the fiber washers 314 which also fit over the shaft 301 between the levers 308. The sleeves 316 fit over the insulating sleeve 315 between the arms 310 and 311 and washers 314. The arms 310 and 311, preferably made of brass, are loosely mounted over the insulating sleeve 315. A fiber washer, 314′, also fits over the sleeve 315 and separates the arms 310 and 311. A bronze spring 317 wound around the brass sleeve 316 is secured to the arm 310 by means of a screw at one end, and the other end is secured to the spring 320. The coil spring 317 maintains the bushing 313 on arm 310 against the lever 308. In addition, spring 317 is also a metallic conductor for electrically connecting the arm 310 to the spring 320. A similar coil spring 318 maintains the bushing 313 on arm 311 against the lever 308, and also provides a metallic circuit to the spring 319. From the foregoing, it can be readily seen that the arms 310 and 311 are insulated from each other. The springs 319 and 320 are also insulated from each other and are mounted on the bracket 300.

When the card-check magnet 330 is energized, bar 303 is raised and the shaft 301 and levers 308 are rotated. The coil springs 317 and 318 cause the arms 310 and 311 to follow the rotation of the levers 308. The arm 310 rotates until the face 312 on arm 310 (Fig. 11) strikes the card 201, while the arm 311 just misses the left-hand edge of the card. In this case, the arm 311 continues to rotate until the bent-back portion on arm 311 carrying the contacts strikes the arm 310 thereby completing a circuit through the contacts on arms 310 and 311. Now in case the card 201 is too far to the left or not far enough, the arms 310 and 311 would rotate until they both strike the card or until they both strike the fiber strip 306 shown in Fig. 11. In this case, the arms 310 and 311 would rotate an equal distance and both strike the card or the fiber strip 306 at the same instance and would not, therefore, make contact with each other. In this case, the circuit is not completed and it will then be understood that the card 201 is not in the proper position, or its twenty-first position. When the armature of magnet 330 is released, the levers 308 rotate back against the bushings 313 to force the arms back to the position shown, and to tension springs 317 and 318.

Referring now to Fig. 12, a description of the trunking arrangement between the transmitters located in the various sales departments and the apparatus in the record room will now be described. In the upper left-hand corner of Fig. 12, three transmitters are shown connected to a transmitter line comprising the conductors C, B, and A, step, and hold conductors which extend from this particular sales department to the record room. In the record room the hold conductor terminates in a group of line and signal relays shown in Fig. 14, while the C, B, A, and step conductors terminate in the switch bank accessible to the finder shown in Fig. 15. In addition, conductors 551 and 552 extend from the line and signal relays to the bank contacts of the finder. In most cases a transmitter line will ordinarily have only one transmitter thereon, but in case the department is a large department, it may be necessary to provide this department with more than one transmitter. The transmitters are designed so that in case one transmitter is using the transmitter line, another transmitter on the same transmitter line will not interfere until the first transmitter has finished transmitting the required information. Each of the transmitter lines has a hold conductor which terminates in the line relay equipment. The line relays are controlled over these conductors to connect a starting ground to a finder switch, in which the particular transmitter line in use appears as first choice. The line relay also applies a marking ground to the vertical bank contacts of the finders.

The finder is of the well-known vertical and rotary Strowger type of switch having access to one-hundred transmitter lines. The transmitter lines terminate in the finder banks in ten levels of ten sets of contacts each. In Fig. 12, only three transmitter lines have been shown. The upper transmitter line is shown terminating in the first level of bank contacts in the top finder. The second transmitter line terminates in the first level of bank contacts in the second finder, and is multiplied to the second level in the top finder and third level in the bottom finder. The bottom transmitter line is shown terminating in the first level of the bottom finder, in the second level of the second finder, and in the third level of the top finder. This arrangement is known as a "vertical slip" between finder switches. It will be noted as shown, that the finder taken into use responsive to the seizure of a transmitter line, is the finder in which the transmitter line terminates as first choice or in the first level. In case this finder should, at this time, be busy, a chain-start circuit is provided extending through all the finders for causing the next finder, or the finder to have second choice to this transmitter line, to be operated.

Having in mind the general layout of the system as shown in Fig. 1 and the general trunking arrangement as shown in Fig. 12, a detailed description of the circuits will now be given.

Referring now to Fig. 13, the small circles shown near the left indicate the contact pins 65 shown in detail in Fig. 5. The various vertical rows of pins 65 are numbered 1 to 25, inclusive, below the lower horizontal row. In the twenty-fifth vertical row the lower pin is electrically connected, as shown, to the pin in the third horizontal row, and is also connected by conductor 401 to the twenty-fifth contact accessible to the A wiper of the switch S. In a similar manner in the twenty-fifth vertical row, the second from the bottom pin is electrically connected to the pin in the second horizontal row and by conductor 402 to the twenty-fifth bank contact accessible to the B wiper of switch S. In a similar manner, the third from the bottom pin in vertical row 25 is connected to the top pin and by conductor 403 to the twenty-fifth bank contact accessible to the C wiper of the switch S. All of the pins in vertical row 1 are connected in a similar manner by conductors 404, 405, and 406 to the first set of bank contacts accessible to the A, B, and C wipers of the switch S. All of the remaining vertical columns numbered 2 to 24, inclusive, are multiplied and connected in the same manner and terminate in the second to the twenty-fourth bank contacts accessible to the wipers of the switch S. The upper three pins, designated 9, are connected in multiple and through the resistance 96 to springs 408. In a similar manner, the lower three pins 9 are multiplied and connected through resistance 97 to springs 409. Keeping in mind that the reference characters in Fig. 13 correspond to similar reference characters in Figs. 2 to 6, inclusive, the detailed description will be proceeded with.

It will now be assumed that the key 60 has operated the cam 62 so as to close springs 63 to condition the transmitter for operation, and that responsive to a sale, the cashier places the merchandise card 8, the cashier's card 7, and the sales clerk's card 6 in the transmitter as shown in Fig. 2. As previously explained, in case the tickets 6, 7, and 8, are correctly inserted, the card-check levers 11 to 17, inclusive, are operated in the correct manner so that the plate 83 may be rotated on its axis to close the springs 79. In case the cards were not correctly inserted, or in case one or more cards were omitted, one or more of the levers would not line up opposite its hole in the plate 83, and therefore the plate 83 would not be rotated and would prevent the closure of springs 79. When the lug 48 on the handle 31 extends through the opening 49, the lug 48 slips over the shaft 50 and at the same time closes the springs 56. Now in case the cards have been correctly inserted, a circuit is closed for operating the locking magnet 58 as follows: from ground by way of spring 63, springs 79 closed by the card-check plate 83, springs 56, springs 418, springs 82, and through the winding of locking magnet 58 to battery. Magnet 58, upon energizing, operates its armature 57 to slide the shaft 50 to the left so that the cam 50' enters into the enlarged opening of 48 in order to hold the companion casing of the transmitter closed during the transmitting period.

In case the cards were incorrectly inserted in the transmitter, the springs 79 would not, therefore, be closed to operate the locking magnet 58 and, therefore, the handle 31 and companion casing would immediately return to the position shown in Fig. 2. The cashier will know by this operation that one or more of the tickets have been incorrectly inserted, or that one or more of the tickets have been omitted. The cashier, therefore, rectifies her error and again closes the transmitter, whereupon the transmitter is locked in the manner just described.

The operation of armature 57 also closes springs 87 to energize relay 101 over the following circuit: from ground by way of springs 63, springs 79, springs 87, and through the winding of relay 101 to the battery. Relay 101, upon energizing, at armature 411 opens a point in the automatic stepping circuit of motor magnet 93 and closes a point in the circuit for relay 102; at springs 412 prepares a locking circuit for the lower winding of relay 105; at springs 413 places a shunt circuit around springs 418 to prevent the deenergization of locking magnet 58 when springs 418 open; and at springs 414 prepares a circuit for operating the solenoid magnet 59. At springs 410, relay 101 closes a circuit for energizing relay 105 in case the transmitter line, comprising the conductors C, B, A, 429, and 430, is not in use.

In case another transmitter on this transmitter line is using the line ground potential is connected by springs, such as springs 63 in the other transmitter, to hold conductor 429 to prevent the seizure of the transmitter line. This guarding ground potential short circuits the upper winding of relay 105 by way of springs 415, 410, conductor 431, and by way of springs 63 to ground. Relay 105, therefore, does not operate over this shunt circuit but the amber light 47 connected to grounded conductor 429 by way of armature 426 lights to indicate to the cashier that another transmitter on this line is, at the present time, in use transmitting data to the record room.

When ground is removed from conductor 429, the amber light 47 is extinguished, and test relay 105 is energized over the circuit extending from ground 663, conductor 431, springs 410, springs 415, through the upper winding of said relay, conductor 429, armature 512 and its resting contact, and through the winding of relay 501 in Fig. 14 to battery. Relay 105 at armature 426 and its resting contacts opens the circuit of the amber light 47 and at its working contacts closes an obvious short circuit around the upper winding of relay 105. Relay 501 in Fig. 14 does not energize in series with the upper winding of relay 105 on account of the high resistance of the upper winding of relay 105. However, as soon as relay 105 operates and at armature 426 connects direct ground from springs 63 to the winding of relay 501, relay 501 immediately energizes. At armature 427, relay 105 energizes relay 103 over an obvious circuit; and at armature 428, relay 105 completes a locking circuit for itself as follows: from ground by way of the working contact of armature 428 and said armature, springs 417, springs 412, and through the lower winding of relay 105 to battery. Relay 105 at armature 428 opens the chain circuit extending through the other transmitters on this same transmitter line to prevent all associated relays, such as relay 105, from being locked up. Relay 103, upon energizing at armature 425 prepares a circuit for relay 104 over the step conductor 430, and at armatures 422, 423, and 424, prepares circuits for the C, B, and A conductors, respectively.

Referring now to Fig. 14, relay 501 is energized at the time relay 105 connects direct ground to conductor 429. Relay 501 at armature 513 prepares a circuit for operating relay 500 over conductor 551; at armature 514 connects negative battery through resistance 516 to the switch-through conductor 552 to prepare an operating circuit for the switch-through relay 600 of the finder shown in Fig. 15; and at armature 515 closes an obvious circuit for the common-start and level-marking relay 502. It should be mentioned, at this time, that relay 502 is common to all of the transmitter line relays and transmitter lines which terminate in the same level of bank contacts in the finder switch. Relay 502, upon energizing, at armature 517 connects ground to vertical-marking conductor 553 which terminates in the vertical bank 624. At armature 518 relay 502 energizes the transmitter line meter 544 over an obvious circuit; and at armature 519 closes a circuit for energizing supervisory relay 505 as follows: from ground by way of springs 519, lamp 528, and through the lower high resistance winding of relay 505 to battery. Relay 505 is energized over this circuit but due to the high resistance of the lower winding of relay 505, the call-blocked lamp 528 is not illuminated. At armature 520, relay 502 grounds the start-in conductor 557 to start an idle one of the finders. In this case, since the finder shown in Fig. 15 is idle, the circuit for energizing the start relay 608 of the finder may be traced as follows: from ground by way of armature 520, start-in conductor 557, spring 648 and the contact normally engaging such spring, and through the winding of relay 608 to battery. As previously explained in connection with Fig. 12, the line relays of the various transmitter lines normally start a finder in which the transmitter line is first choice and, therefore, since no finders are busy, the finder taken into use will be a finder in which the transmitter line terminates in the first level. In case the finder shown in Fig. 15 is in use, the transfer relay 607 would be energized and the start conductor would be transferred from conductor 557 to conductor 656 by way of springs 648 and 649 of relay 607. Under these circumstances, the relay corresponding to relay 608 in the next finder would be energized to start such finder to find the calling transmitter line. This arrangement is clearly disclosed in Fig. 12 and therefore need not be considered further at this time.

Supervisory relay 505, upon energizing, at armature 527 closes an obvious circuit for energizing the slow-to-energize dash-pot relay 509. The dash-pot relays such as 509 and 510 are well known and have been used extensively in telephone systems. These relays are of the solenoid type and operate plungers immersed in oil so that the plungers operate slowly. These dash-pot relays are easily adjusted to operate their armatures only after a predetermined time interval. In the present instant, dash-pot relay 509 is made slow enough so that the springs 529 and 530 will never close on an ordinary call unless some trouble occurs. In the particular instant shown, the finder shown in Fig. 15, under normal conditions will switch through and cause the circuits of relays 501, 502, and 505 to be opened before the dash-pot relay 509 has sufficient time to operate and close its springs 529 and 530.

Referring now to the finder shown in Fig. 15 and at the time when start relay 608 is energized over the start-in conductor 557, said relay at springs 651 connects the vertical test wiper 625 in a series circuit including the stepping relay 602 and the slow-to-operate changeover relay 603. At armature 652, relay 608 closes an obvious circuit for relay 605, and at armature 653, closes a shunt circuit around springs 650 for maintaining the circuit to the busy-common relay 506 in Fig. 14 closed for an interval after the transfer relay 607 is energized. It should be mentioned, at this time, that the busy-common relay 506 is connected by the busy-common conductor 558 to all of the finders by way of conductors, such as conductor 558, which conductors are connected by way of springs 650 to the common-supervisory ground conductor 559. Therefore, the busy-common relay 506 is maintained normally energized as long as there is an idle finder switch.

Relay 605, upon energizing, at armature 644 closes an energizing circuit for the vertical magnet 609 at its working contacts and at its resting contacts opens a point in the circuit to the release magnet 611; and at springs 657 prepares a temporary locking circuit for relays 600 and 601. The circuit for energizing the vertical magnet 609 may be traced as follows: from ground by way of armature 628 and its resting contact, armature 644 and its working contact, springs 636, and through the winding of vertical magnet 609 to battery. Vertical magnet 609, upon energizing, operates the shaft and wipers 613, 615, 617, 619, 621, 623, and 625, one vertical step. The vertical wiper 625 is now in engagement with the vertical bank contact 624, and the regular wipers 613, 615, 617, 619, 621, and 623, are positioned opposite the first level of bank contacts. The off-normal springs 643 close on the first vertical step of the shaft to energize the off-normal relay 604. Relay 604, upon energizing, at armature 641 prepares a point in the circuit for the release magnet 611, and at armature 642 prepares a circuit for locking relay 606 and transfer relay 607 in series.

In order to describe the vertical-stepping operation of the finder, it will first be assumed that the vertical bank contact 624 is not grounded. Vertical magnet 609, upon energizing, at springs 637 closes an energizing circuit through the upper winding of stepping relay 602. Stepping relay 602, upon energizing, at armature 635 connects ground to the upper winding of switch-through relay 600 to prepare its initial energizing circuit, and at springs 636 opens the circuit to the vertical magnet 609. Vertical magnet 609 deenergizes, and at springs 637 opens the circuit extending through the upper winding of stepping relay 602. Now, since the vertical test wiper 625 is assumed to be in engagement with a non-grounded vertical test contact, the circuits for the changeover relay 603 and to the lower winding of stepping relay 602, for maintaining the latter relay energized, is not completed, and therefore stepping relay 602 deenergizes, and at springs 636 again completes the circuit for the vertical magnet 609. Vertical magnet 609 energizes over its previously-traced circuit to step the shaft and wiper in another vertical step. The vertical magnet again energizes stepping relay 602 to interrupt the circuit to the vertical magnet 609. The interaction between magnet 609 and stepping relay 602 continues until the vertical test wiper 625 encounters a grounded vertical test contact, at which time a circuit may be traced for energizing the changeover relay 603 and for maintaining the stepping relay 602 energized over a circuit as follows: from ground by way of the grounded vertical test contact, such as contact 624, wiper 625, springs 651, winding of changeover relay 603, and through the lower winding of stepping relay 602 to battery. Stepping relay 602 is maintained energized over this circuit to maintain the circuit for the switch-through relay 600 at armature 635, and to maintain the circuit to the vertical magnet 609 open at springs 636. Changeover relay 603, upon energizing, at springs 638 completes a locking circuit for itself and stepping relay 602 independent of the grounded vertical test contact as follows: from ground by way of armature 628 and its resting contact, armature 644 and its working contact, springs 638, winding of relay 603, and through the lower winding of stepping relay 602 to battery. A branch of this circuit extends by way of springs 639 and interrupter springs 640 of the rotary magnet 610, and through the winding of the rotary magnet 610 to battery. The rotary magnet 610, upon energizing, over the above-traced circuit, rotates the wipers 613, 615, 617, 619, 621, and 623 into engagement with the first set of bank contacts in the level opposite which such wipers have been positioned and rotates the vertical test wiper 625 out of engagement with the vertical test contact. The further operation of the finder is now dependent upon the test wiper 623 encountering a battery potential.

In case the first contact engaged by test wiper 623 has a ground potential or no potential thereon, the switch-through relay 600 is not energized. The rotary magnet 610, near the end of its stroke, opens the interrupter springs 640 to interrupt its own circuit. The rotary magnet 610, therefore, falls back and at springs 640 again completes its own circuit to rotate the shaft another step. The operation just described continues until the test wiper 623 encounters a battery potential, such as the battery potential applied to switch-through conductor 552 terminating in contact 622, whereupon a circuit may be traced by way of wiper 623 through the upper winding of switch-through relay 600 to ground at springs 635. Relay 600 energizes over the above-traced circuit and at armature 628 and its resting contact opens the circuit extending to the rotary magnet 610 before the same can again operate and rotate the wipers another step, and at its working contact closes a circuit for grounding release-trunk conductor 554 and for energizing the transfer relay 607 and relay 606 in series.

At armature 627, relay 600 closes an energizing circuit for relay 601 in series with the lower winding of switch-through relay 600 and for maintaining this switch-through relay 600 in operated position. This circuit may be traced as follows: ground by way of springs 657, springs 627, through the winding of switching relay 601, and through the lower winding of switch-through relay 600, to battery. At armature 626, relay 600 prepares a circuit extending over test wiper 623 for maintaining relays 600 and 601 locked up to switch through conductor 552. The circuit for energizing relays 606 and 607 extends by way of armature 628 and its working contact, through the upper winding of transfer relay 607, and through the winding of relay 606 to battery. At springs 646 relay 606 closes a circuit extending by way of the working contact of armature 642 and said armature for maintaining the transfer relay 607 energized until the finder is restored to its normal position. Relay 607, upon energizing, at springs 647 and 648 closes a circuit through the lower winding of relay 607 to the holding battery conductor 556 to maintain itself energized as long as ground is connected to the start-in conductor 557 or conductor 656; at springs 648 opens the circuit to the slow-release relay 608; at springs 648 and 649 transfers the start-in lead conductor 557 to the start-out conductor 656 which extends to the next finder in the chain; and at springs 650 opens a point in the circuit of the all-trunks-busy relay 506. After an interval of time for which it is adjusted, slow-to-release relay 608 deenergizes and at springs 651 opens the circuit to the relays 602 and 603, such circuits, however, being previously opened when the vertical wiper took its first rotary step; at springs 653 opens a further point in the circuit for the all-trunks-busy relay 506; and at springs 652 opens the circuit of relay 605. Relay 605, upon deenergizing, at armature 644 opens a further point in the stepping circuit at its working contacts and at its resting contact closes another point in the circuit for the release magnet 611; at armature 645 prepares a circuit for maintaining transfer relay 607 energized; and at armature 657 disconnects one of the locking grounds from relays 600 and 601. Before this ground is removed, ground will be sent back over conductor 552 and the test wiper 623 for maintaining the switch-through relay 600 and switching relay 601 energized as will be more fully explained hereinafter.

When switching relay 601 energized in series with the lower winding of switch-through relay 600, an appreciable time before slow-to-release relay is deenergized, relay 601 at springs 630, 631, and 632 connects the C, B, and A conductors to the C, B, and A wipers of the switch S by way of wipers 613, 615, and 617, respectively. At armature 633, relay 601 connects the step conductor 430 to conductor 654 by way of bank contact 618 and wiper 619. At springs 634, relay 601 connects ground to conductor 655 for energizing relay 701 shown in Fig. 16, and relay 500 shown in Fig. 14; the circuit for relay 701 extending by way of armature 710 and its resting contacts, through the winding of relay 701 to battery, and the circuit for energizing relay 500 extending by way of wiper 621, bank contact 620, conductor 551, springs 513, and through the winding of relay 500 to battery.

Relay 500 at springs 511 closes a locking circuit for itself including the resistance 515' and hold conductor 429 which is grounded at springs 63 in the transmitter, and at armature 512 and its resting contact opens the circuit of relay 501, and at its working contact connects the grounded hold conductor 429 to conductor 552 for maintaining relays 600 and 601 in energized position before the slow-to-release relay 608 has deenergized relay 605 to open springs 657. The adjustment on relay 500 is fairly sensitive in that relay 500 will remain locked up through resistance 515' only as long as direct ground is connected to the hold conductor 429. If the hold conductor 429 is grounded through the upper winding of relay 105, or even if this conductor is grounded in multiple through the windings of several relays, such as 105 in the transmitter on this line, the resistance 515' is sufficiently great to cause relay 500 to release. It is necessary to release relay 500 under these conditions because one or more transmitters on the same line may be waiting to transmit. Relay 501, upon deenergizing, at springs 513 opens the initial energizing circuit of hold relay 500; at springs 514 removes the battery potential connected to switch-through conductor 552; and at springs 515 opens the circuit to the start and marking relay 502. Relay 502 at springs 517 disconnects ground from the vertical marking conductor 553; at springs 518 opens the circuit to the transmitter line meter 544; at springs 520 removes ground from the start-in conductor 557 so as not to start a second finder when the transfer relay 607 energizes to transfer the start lead to conductor 656; and at springs 519 opens the circuit to the supervisory relay 505. Supervisory relay 505 deenergizes, and at springs 527 opens the circuit to the dash-pot relay 509 before the dash-pot relay has had time to close springs 529 and 530. The operations of the relays and their functions in Fig. 14 will be explained more fully hereinafter.

Relay 701 (Fig. 16), upon energizing, at springs 712 connects ground through the lower windings of relay 704 to 709, inclusive, over an obvious circuit. Relays 704 to 709, inclusive, are electro-polarized relays and the circuits through their lower windings polarize each relay so that relays 705, 707, and 709 respond only when negative battery is connected through their upper windings and relays 704, 706, and 708 respond only when ground is connected through their upper windings. At springs 713, relay 701 connects ground to step conductor 654 which extends by way of springs 633, wiper 619, bank contact 618, step conductor 430 (Fig. 13), springs 425, and through the winding of relay 104 to battery for energizing relay 104.

Relay 104 at springs 407 connects the grounded conductor 431 by way of springs 416 to the motor magnet 93 of the switch S. Motor magnet 93 energizes over the above-traced circuit to open its interrupter contacts 100 which are ineffective at this time, and to position the stepping pawl so as to step the switch when magnet 93 deenergizes. At springs 408, relay 104 connects negative battery through resistance 96 to the three upper multiple pins indicated at 9, and at springs 409 connects the three lower multiple pins 9 to the grounded conductor 431 by way of resistance 97.

All of the apparatus is now in position to transmit and receive the first code impulses from the sales room to the recording room. The transmission of these codes is now dependent upon the holes or perforations in the cards 6, 7, and 8 through which the pins, such as pin 44 in Fig. 2, extend to make contact with the pins, such as pin 65. Such connections are indicated by heavy black circles shown in the twenty-five vertical columns in the rows of pins 65 in Fig. 13.

The following is a code chart showing the combination code or the potential connected to the various conductors such as C, B, and A for the various digits and the relays which are energized responsive to each of the combinations:

| Digit | Code | Relays |
|---|---|---|
| 0 | A pos. C pos. | 704, 708 |
| 1 | B pos. A neg. | 706, 705 |
| 2 | C pos. B neg. | 708, 707 |
| 3 | A neg. C neg. | 705, 709 |
| 4 | A pos. B neg. | 704, 707 |
| 5 | A pos. B pos. | 704, 706 |
| 6 | B pos. C pos. | 706, 708 |
| 7 | C pos. A neg. | 708, 705 |
| 8 | A neg. B neg. | 705, 707 |
| 9 | B neg. C neg. | 707, 709 |
| X | A pos. C neg. | 704, 709 |
| Y | B pos. C neg. | 706, 709 |

In this case, since the No. 8 digit is punched in card 6 in the first vertical column as shown by the heavy circles, the A and B conductors are connected to battery as follows: from battery by way of spring 408, resistance 96, through the upper-three multiply-connected contacts 9 to the two heavy circles shown in No. 1 vertical column, one path extending by way of conductor 404 connected to the No. 1 bank contact accessible to the A wiper, springs 424, A conductor, contact 616, wiper 617, springs 632, and through the upper windings of electro-polarized relays 704 and 705 to the mid-point of battery; herein marked with the letter N in a circle; the other path extending by way of conductor 405 which terminates in the No. 1 bank contact accessible to the B wiper, springs 423, B conductor, contact 614, wiper 615, springs 631, and through the upper winding of electro-polarized relays 706 and 707 to the mid-point of battery. Electro-polarized relays 707 and 705 only operate over the above-traced circuit. Relays 706 and 704 do not operate when negative battery is connected to the B and A conductors, because such relays have been polarized in the opposite direction and respond only to a positive or ground potential.

As previously explained in connection with Fig. 8, the cards 200 and 201 and the carriage have by this time advanced to their twenty-first position, and the card-check mechanism has been operated to test the position of card 201 after which the punch carriage waits in readiness to receive the digit impulses to be transmitted to the punch by the operation of the electro-polarized relays 704 to 709.

In order to more fully understand this operation, a review of the above operation will now be given tracing the detailed circuits for accomplishing the above. When the card 200 is placed on the carriage and the lever 207 closed, the door contacts 209 close a circuit for energizing brush magnet 211 as follows: from ground by way of door contacts 209, now closed, normally-closed springs 223, which are not opened until the carriage reaches its twenty-first position, winding of brush magnet 211, resting contact of spring 281 and said spring to battery. Brush magnet 211, upon energizing, operates its armature to cause brush 278 to engage the roller 210 and to cause the twelve brushes 213 to be operated against the card 200. At armature 288, brush magnet 211 grounds conductor 751 thereby energizing relay 703 of Fig. 16 over an obvious circuit. By the operation of the brush magnet 211, another circuit may be traced for energizing the No. 1 punch setting magnet such as magnet 255 shown in Fig. 8, over the following circuit: ground by way of door contacts 209, springs 223, floating cam springs 224, brush 278, roller 210, No. 1 brush of the brushes, such as brushes 213, which brush is in engagement with the roller 210 because of the perforation in No. 1 digit space in the vertical column of card 200, and through the winding of the No. 1 brush-setting magnet to battery at springs 281. In the same manner as previously described, the No. 1 punch-setting magnet operates its slide bar to close springs 258 and close an obvious circuit for the punch magnet 262. Responsive to the operation of the punch magnet 262, the card 201 is punched in the first column in accordance with the digit 1 and causes the springs 258 and 224 to be opened in the manner previously described. The cards and carriage are stepped to their second position, the No. 1 digit magnet is released by the opening of springs 224, and when the slide bar associated with the punch-setting magnet returns to its normal position, the springs 224 again close. In second position, the digit 8 punch-setting magnet is energized by way of door contact 209 and digit 8 wiper 213 to punch the card 201 with the digit 8. The cards and carriage are then stepped to their third position where the card is punched in the third vertical column in the digit 3 location in a manner similar to that previously described. After perforating the card 201 in the fourth vertical column, the punch automatically skips to the twenty-first position as previously described to open the twenty-first column springs 223 as previously described.

On the preceding operation of the punch, the relays 702 and 703 were left energized and locked up over the following circuit. The circuits for initially energizing relays 702 and 703 will be more fully explained hereinafter. The circuit for maintaining relay 702 in energized position extends from ground by way of springs 715, through the winding of said relay, and through resistance 716 to battery. The locking circuit for relay 703 extends from ground by way of springs 714, springs 719, and through the winding of relay 703 to battery.

When the carriage reaches its twenty-first position, the springs 223 are opened in the manner previously described to open the circuit of the brush magnet 211, whereupon the brush magnet deenergzes and at armature 288 and its resting contacts closes a circuit for operating the check magnet 330 over the following circuit: from ground by way of armature 288 and its resting contact, conductor 748, springs 718, conductor 749, through the winding of check magnet 330, and through the resting contacts of springs 281 to battery. In case a card such as 201 has been operated correctly and is in its twenty-first position, the operation of armature 308 of cardcheck magnet 330 causes lever 310 to engage lever 312 in the manner previously described. A circuit may now be traced from ground by way of levers 310 and 312, conductor 750, springs 720, through the winding of relay 702 to springs 715 and ground. Relay 702 is short circuited over the above-traced circuit and, therefore, after an interval, releases and opens its springs 714 and 715. By the opening of its springs 715, relay 702 opens its own locking circuit, and by opening springs 714, relay 702 opens the locking circuit of relay 703, whereupon the relays 702 and 703 deenergize. At springs 717, relay 702 removes ground from the release-trunk conductor 554 to open the circuit of relays 606 and 607 of the finder, in case such finder in the meantime had been released to its normal position, and to release the punch meter 543 and dash-pot relay 510. The feeding of a new card, such as card 201, onto the carriage, the perforating of the new card in its first four vertical positions, and the movement of the card and carriage to its twenty-first position, together with the card-checking operation just described, takes place immediately after a preceding card, such as card 201, has been completely punched on a preceding call by the transmitter sending the proper coded impulses to the decoding relays shown in Fig. 16. Therefore, the cards and carriage shown in Fig. 8 remain in their twenty-first positions until a new call comes in, such new call being the call now set up on the transmitter by the cards 6, 7, and 8 and which call has also been described up to and including the energization of electro-polarized relay 705 and 707 over the A and B conductors.

Responsive to the energization of relays 705 and 707, such relays at armatures 725 and 733 prepare a locking circuit for relay 700 and at springs 727 and 736 close a circuit for operating the No. 8 punch-setting magnet over the following path: from ground by way of armature 741 and its resting contact, armature 737 and its resting contact, springs 727, springs 736, conductor 768, winding of punch-setting magnet 8 to battery through springs 281. Punch-setting magnet 8, upon energizing, operates its slide bar to close springs 258 to operate the punch magnet 262 in the same manner as previously described. Punch magnet 262 punches the card 201 in the No. 8 hole in the twenty-first vertical column of card 201. The closure of springs 258 completes a circuit for energizing relay 700 as follows: from ground by way of armature 288 and its resting contact of brush magnet 211, conductor 748, through the upper winding of relay 700 to conductor 747, through the resistance R and through the springs 258 to battery. Relay 700, upon energizing, at springs 711 completes a locking circuit through its lower winding to grounded armatures 725 and 733; and at armature 710 opens the circuit to relay 701 at its back contact, and at its working contact completes a circuit for energizing relay 702 as follows: from ground by way of springs 634, conductors 655, armature 710, through the winding of relay 702, and through the resistance 716 to battery. Relay 702, upon energizing, at springs 715 completes a locking circuit for itself; at springs 714 prepares a locking circuit for relay 703; and at springs 717 connects ground to release-trunk conductor 554 to maintain the finder of Fig. 15, its associated control relay group, Fig. 16, and its associated punch, Fig. 17, busy and guarded against seizure until after the transmitter now in use and the finder has released and until the punch shown in Figs. 8 and 17 have automatically set in a new card ready for a subsequent call, at which time the card-check magnet 330 is operated as previously described to short circuit the relay 702, and thereby remove the ground from release-trunk conductor 554 when relay 702 deenergizes. At springs 712, relay 701, upon deenergizing, opens the polarizing winding of the electro-polarized relays 704 to 709, inclusive, to deenergize any of such relays which, at this time, may be operated. In addition, relay 701 at 713 removes ground from the step conductor 654 to cause the switch S in the transmitter to advance a step.

In the meantime, the operation of the punch magnet 262 has opened springs 258 to open the original energizing circuit of relay 700. The release of electro-polarized relay 705 and 707, opens the circuit to the No. 8 punch-setting magnet which thereupon deenergizes and the card 201, after being perforated, is advanced to its twenty-second position in the same manner as previously described.

When ground is removed from step conductor 654 by the deenergization of relay 701 in Fig. 16, relay 104, Fig. 13, deenergizes responsive thereto. At springs 408 and 409, relay 104 disconnects battery and ground from the multiply-connected contacts 9, and at springs 407 opens the circuit to the motor magnet 93. Motor magnet 93 upon deenergizing, operates its pawl to advance the wipers of the switch S from their first to their second position. Wiper P upon engaging its second bank contact, closes a circuit from grounded conductor 431 by way of armature 411 and its working contacts, and through the winding of relay 102 to battery. Relay 102, upon energizing, at springs 420 completes a circuit for energizing the green lamp 46 to indicate to the cashier that the transmitter is transmitting the coded impulses to the punch, and at springs 421 prepares a circuit for energizing relay 106 in series with relay 102. Relay 106 does not energize at this time because the relay is short circuited.

Responsive to the deenergization of the electro-polarized relays in Fig. 16, the locking circuit for the lower winding of relay 700 is opened and accordingly relay 700 deenergizes, and at armature 710 and its resting contact again completes the circuit for energizing relay 701 from grounded conductor 655. Relay 701 again completes the circuit through the lower windings of the electro-polarized relays at springs 712, and at springs 713 again completes the circuit for energizing relay 104 in the transmitter. Relay 104 again energizes. The pins in the transmitter extending through the perforations in the second vertical column of card 6, now complete circuits for grounding the A and B conductors as follows: from grounded conductor 431, springs 409, resistance 97, the lower multiply-connected contacts 9 to the movable pins in the upper casing where the circuit divides, one path extending by the lowermost pin in column 2 as indicated by the heavy black circle to the second bank contact accessible to wiper A, springs 424, conductor A, through the bank contact 616 and finder wiper 617, springs 632, and through the upper winding of relays 704 and 705 to the mid-point of battery; the second path extending through the second from the bottom pin 65 in column 2 as indicated by the heavy black circle to the second bank contact accessible to the B wiper of switch S, springs 423, conductor B, through the bank contacts 614 and wiper 615 of the finder, springs 631, and through the upper winding of the electro-polarized relays 706 and 707 to the mid-point of battery. At springs 407, relay 104 again completes the circuit for energizing the motor magnet 93 of the switch S to operate its pawl preparatory to stepping the wipers of the switch S.

Relays 704 and 706 alone energize over the above-traced circuit and such relays at armatures 721 and 729 prepare the locking circuit for the lower winding of relay 700, and at springs 722 and 731 complete a circuit for energizing the digit 5 punch-setting magnet as follows: from ground by way of armature 741 and its resting contact, armature 737 and its resting contact, springs 722, springs 731, conductor 765, through the winding of the punch-setting magnet 5, and through the resting contact of springs 281 and such spring to battery. The punch-setting magnet operates its slide bar and closes the contacts 258 to energize the punch magnet 262 and relay 700 in the same manner as previously described. Relay 700 energizes and locks up causing relay 701 to deenergize to step the switch in the transmitter and to deenergize the operated electro-polarized relays, which in turn, when deenergized, cause relay 700 to deenergize and reestablish the circuit for relay 701 to again polarize the electro-polarized relay and to operate the motor magnet of the switch in the transmitter. By this time, the card in the punch has been advanced to its twenty-third position, and when relay 701 again energizes, relay 104 completes a circuit for grounding the A conductor and for connecting negative battery to the B conductor through the holes in the third column of the card 6 for energizing electro-polarized relays 704 and 707 which in turn energize the No. 4 punch-setting magnet to punch the card 201 in the twenty-third column in accordance with the digit 4. In the same manner as just described, the switch S in the transmitter is operated step by step responsive to each punching operation to pick up the combinations closed by the pins extending through the holes in the cards 6, 7, and 8. By consulting the above chart, the various combinations for energizing the polarized relays for the various digits, as determined by the perforations in the cards, may be readily understood in view of the foregoing description. The switch S in the transmitter, therefore, successively picks up the combinations, as shown by the heavy black circles, and advances the punch step by step until the last position, or position 45, of the card 201 has been punched. When the punch carriage reaches its forty-fifth position, the springs 276 close and complete an energizing circuit for relay 286 as follows: from ground by way of door contacts 209, springs 263 of the punch magnet, winding of relay 286 and through the forty-fifth position springs 276 to battery. Relay 286 energizes over the above-traced circuit, and at springs 287 prepares a circuit for energizing the stacker magnet 274, such magnet at this time being short circuited by springs 263 and ground at contacts 209. When the punch magnet 262 releases shortly thereafter, springs 263 remove the short circuit from around the stacker magnet 274 and such magnet then energizes in series with relay 286. As previously explained, the stacker magnet causes the ejector 268 of Fig. 8 to remove the card 201 from the carriage and to cause the bar 275 to operate the ejector contacts 277. The closure of ejector contacts 277 complete a circuit by way of springs 276, the motor magnet 280 to cause this magnet to energize and lock the spring 281 in operated position against its lower operating contact by the locking lever 284. The operation of springs 281 removes battery from all of the magnets in the punch at its upper contact and at its lower contact completes the circuit for operating the motor 283. As previously described, the motor operates the carriage back to its first position, and at the same time causes a new card to be placed on the carriage. On the return movement of the carriage, the forty-fifth position contacts 276 opens the circuit of the relay 286 and stacker magnet 274 to cause the stacker magnet to eject the card into the card hopper. The ejector 268 is again set in the position shown in the manner previously described. At the time the carriage is returned to its first position and a new card has been placed on the carriage, and the ejector 268 has been locked in the position shown, a pin 285 on a cam strikes the locking lever 284 to unlock spring 281 to permit this spring to return to the position shown. The operation of the spring 281 again connects battery to the magnets of the punch and also opens the circuit to the motor 283. As soon as spring 281 strikes its upper contact, brush magnet 211 is energized to again operate brush 278 and brushes 213 as previously described. At armature 288 and its working contacts, brush magnet 211 completes an energizing circuit over conductor 751 for relay 703. At springs 718, relay 703 prepares a circuit for the card-check magnet 330; at springs 719 completes a locking circuit for itself including springs 714 on relay 702, which, at this time, is locked up; and at springs 720 prepares a circuit for short circuiting and releasing locked-up relay 702.

The punch now operates in the manner previously described, to duplicate the perforations in the master card 200 in the new card placed in the carriage, and the carriage is finally brought to rest in its twenty-first position, at which time the twenty-first position springs 223 opens the circuit to the brush magnet 211 to cause this magnet to deenergize and complete the previously-traced circuit for the card-check magnet 330. If the card is in the proper position, that is, its twenty-first position, the operation of card-check magnet 330 short circuits relay 702 which thereupon deenergizes and causes relay 703 to deenergize as previously described. At springs 717 relay 702 removes the guarding ground from release-trunk conductor 554. The control relays shown in Fig. 16 remain in the position just described, and the carriage of the punch remains in its twenty-first position until another call comes in from a transmitter line.

Referring now to the transmitter in Fig. 13 and at a time when the wipers of the switch S rotated from its twenty-fifth position back to normal to its first position, it will be seen that when the wiper P leaves its twenty-fifth position, the short circuit around relay 106 is removed and relay 106 accordingly energizes over the following circuit: from ground by way of springs 63, card-check springs 79, winding of relay 106, springs 421, and through the winding of relay 102 to battery. At springs 415, relay 106 removes ground from the holding conductors 429; at springs 416 opens the circuit extending to the motor magnet 93; at springs 417 opens the locking circuit of transfer relay 105; at springs 418 opens a point in the circuit extending through the holding magnet 58, this circuit, however, being maintained closed at springs 413; and at springs 419 completes a circuit for energizing the printing solenoid 59 as follows: from ground by way of springs 63, card-check springs 79, springs 87, springs 414, springs 419, and through the winding of the solenoid to battery. By the operation of the solenoid, the plunger 80 is operated to strike the print casing 18' and 18 to cause the type 19 to print the date of sale on the card, such as card 8. It should be mentioned at this time that the type 19 in each of the transmitters is changed each day to correspond to the correct date. Near the end of its stroke the solenoid 59 operates and opens the springs 82 to open a circuit for magnet 58. Magnet 58 thereupon releases its armature 57 to open springs 87, and to permit the shaft 50 to slide to the right, whereupon the coil springs 74 permit the companion casing to return to normal position or the position shown in Fig. 2. The springs 56 and 79 are opened by this operation and the relays in the transmitter are all returned to their normal position. The circuit of relay 101 and the solenoid 59 being opened at springs 87, the circuit of relays 102 and 106 being opened at card-check springs 79. When the transfer relay 105 deenergizes, this relay at armature 428 again completes the chain circuit between the various transmitters on this particular line. All of the apparatus of the transmitter shown in Fig. 13 is now in its normal position, and the cards 6, 7, and 8 may be removed to permit another call to be sent through.

When ground is removed from the holding conductor 429 by the energization of relay 106 in the transmitter the locking circuits for relay 500, Fig. 14, and relays 600 and 601, Fig. 15, are opened. Relay 500, upon deenergizing, at springs 511 opens its own locking circuit and at armature 512 and its working contact opens a further point in the locking circuit of relays 600 and 601 and at its resting contact prepares a circuit for line relay 501. Relay 601 at springs 630 to 633, inclusive, disconnects the finder wipers from the control equipment shown in Fig. 16 and at springs 634 disconnects ground from conductors 551 and 655. Relay 600 at springs 626 and 627 opens a still further point in its own locking circuit and at armature 628 and its working contact removes ground from release trunk conductor 554, and at its resting contact completes a circuit for energizing the release magnet 611 as follows: from ground by way of armature 628 and its resting contact, armature 644 and its resting contact, springs 641, winding of release magnet 611, conductor 555, and through the winding of supervisory relay 508, to battery. Supervisory relay 508 and release magnet 611 energize in series. By the operation of the release magnet 611, the wipers of the finder are restored to their normal positions and the off-normal springs 643 are opened to deenergize relay 604. If for some reason the shaft of the finder did not properly release, the off-normal springs 643 would remain closed and the circuits through the release magnet 611 and supervisory relay 508 would be closed long enough to bring in an alarm as will be more fully explained hereinafter. When relay 604 deenergizes springs 641 opens the circuit extending through the release magnet 611 and relay 508, and under normal conditions, relay 508 deenergizes before it has been energized sufficiently long to bring in an alarm. At springs 541, however, peg count meter 548 is operated to indicate the number of times the punches in the record room have been taken into use. At armature 642 and its working contact, relay 604 opens the locking circuit of relays 606 and 607, and at its resting contact prepares a circuit for operating relays 606 and 607 by way of the release-trunk conductor 554. Relay 606, upon deenergizing, at springs 646 opens another point in its own locking circuit.

The release of transfer relay 607 at this time, is dependent upon whether or not the next finder in the chain has been taken into use on another call. In this case, assuming that the next finder has just been taken into use, a circuit may be traced through the lower winding of transfer relay 607 for maintaining such relay in energized position until the next finder switches through. This circuit may be traced as follows: from ground by way of springs, such as springs 520, start-in conductor, such as start-in conductor 557 extending to the next switch up through the start-out conductor 656, armature 649, spring 648, spring 647, through the lower winding of transfer relay 607, common conductor 556, to negative battery at armature 531. The reason for this circuit is to prevent the finder shown in Fig. 15 from stealing the call away from the next finder after the next finder has been partially operated to find the calling transmitter line. When the second finder finds the calling transmitter line, its switching and switch-through relays energize to operate its associated transfer relay, such as 607. The operation of the transfer relay, in the second finder, and the operation of the switching relay in the second finder causes the holding relay, such as holding relay 500 of the calling line to energize and open the circuit of the line relay such as line relay 501 of the calling line, which, in turn, denergizes the start relay, such as start relay 502, to remove ground from the start-in conductor extending to the second finder. As soon as this takes place, the transfer relays 607 and 606 in the first finder are released. The finder switch shown in Fig. 15 is now completely released and is available for another call. It will now be assumed that the new card inserted in the punch is not correctly positioned in its twenty-first position and, therefore, when the card-check magnet 330 is energized, the levers 310 and 312 do not make contact or engagement with each other to close a circuit for short circuiting relay 702. Relay 702, therefore, does not deenergize and, therefore, does not remove ground from release-trunk conductor 554 at springs 717. Under these conditions when ground is removed from the hold conductor 429 and hold relay 500 is deenergized, ground is also removed from the release-trunk conductor 552. When ground is removed from conductors 429 and 552 the locking circuit of relays 600 and 601 is opened and the relays deenergize accordingly. The finder switch is released in the same manner as previously described, but at this time, since the release-trunk conductor 554 is grounded because one of the new cards has not been properly positioned, a circuit may be traced from ground at springs 717, release-trunk conductor 554, through the upper winding of transfer relay 607, and through the winding of relay 606 to battery. Relays 606 and 607 are maintained energized over this circuit, and in case the start-in conductor 557 is grounded on a new call, the call will be transferred to the next or succeeding finder by way of the start-out conductor 656. The continued energization of the transfer relay 607, therefore, maintains the finder busy so that subsequent calls will be transferred to the next finder-punch link in the chain.

In case no card was fed onto the carriage due to a mechanical fault or due to the fact that the pile of cards, such as 202, were exhausted at this time, the punch will be automatically advanced, in the same manner as described, to its twenty-first position, and the card-check magnet 330 will again fail to release the relay 702 and therefore the release-trunk conductor 554 would be maintained grounded with the same result as just previously described.

Referring now to Fig. 14 and at a time when release-trunk conductor 554 is grounded because relay 702 does not deenergize responsive to the operation of the card-check magnet, the dash-pot relay 510, after a predetermined time, operates its armature to close springs 534 and 535. The closure of springs 534 operates the buzzer 542 to sound an alarm, and by the closure of springs 535 the No. 1 punch lamp 536 is illuminated to indicate that the No. 1 punch is in trouble and that a card has not been properly positioned in its twenty-first position. Since lamp 536 is individual to the No. 1 punch or the punch shown in Fig. 17, the attendant will know that the No. 1 punch is out of order, and will, therefore, take whatever steps is necessary to again put the punch into service. In case the cards 202 need replenishing, the attendant will do so and operate the space key to cause the punch to place a new card on the carriage and advance it to its twenty-first position in the well-known manner after which point the card-check magnet 330 is again energized and after the card is in its proper position the relay 702 deenergizes and removes ground from release-trunk conductor 554 to release the dash-pot relay 510, thereby opening the circuit of the buzzer 542 and the alarm lamp 536. In case the card 201, through some fault was not properly positioned on the carriage, the attendant would go to the No. 1 punch responsive to the alarm, and operate the shift key to cause this card to be ejected from the carriage and to cause the carriage to automatically feed in a new card. This new card is again checked automatically when the carriage reaches its twenty-first position, and in case the card was in its proper position, ground would be removed from the release-trunk conductor 554 in the same manner as previously described.

In case any one of the vertical columns in any one of the cards in the transmitter should be perforated incorrectly, the lamp 536 and alarm 542 is operated when the switch S in the transmitter reaches this position. It will first be assumed that this vertical column contains only one perforation. Under this condition only one of the electro-polarized relays in Fig. 16 will be energized. Since only one such relay is energized, no circuit is extended for operating the punch in Fig. 17 and since the punch is not operated, relay 700, Fig. 16, is not energized to release relay 701. Relay 701, therefore, remains energized and the switch S does not take any further steps. Therefore, after an interval, due to the ground at armature 628 connected to release trunk conductor 554, the lamp and signal is operated. It will now be assumed that one of the vertical columns in the card has more than two perforations. Under this condition, the A, B, and C conductors will each have a potential connected thereto and three of the electro-polarized relays in Fig. 16 will be energized. With three of such relays energized, there will be no operating ground for operating the punch. As will be seen, the upper row of armatures 721, 725, 729, 733, 737, and 741 control the ground connections for operating the punch and in case three of such relays should be energized over the A, B, and C conductors, three of the above armatures would at this time be operated to prevent ground from being extended to the punch. The punch and switch S are therefore not operated and after an interval the lamp 536 and signal 542 are operated.

In case the finder switch, shown in Fig. 15, fails to switch through due to some fault, ground is not connected to conductor 551 since relay 601 did not energize and hold relay 500, therefore, does not energize to open the circuit of relay 501. Relay 502 is, therefore, maintained energized long enough to permit the dash-pot relay 509 to fully operate. At springs 529, dash-pot relay 509 closes an obvious circuit for operating the buzzer 542 to sound an alarm, and at springs 530 connects battery through the upper-lower resistance winding of relay 505, and through the call-blocked winding of relay 505, and through the call-blocked lamp 528 to ground at springs 519 for illuminating the lamp 528. Upon hearing the alarm signal, the attendant, upon observing that the call-blocked lamp 528 is illuminated, will know that a call is blocked and held up because the finder has failed to switch through properly. The attendant will immediately investigate the trouble and rectify the error.

It may also happen that after a call has been completed, that the finder does not properly release, and, therefore, the previously-traced circuit to the release magnet 611 of the finder and the slow-to-release supervisory relay 508 is maintained closed for a sufficient interval of time to permit the dash-pot relay 509 to bring in an alarm. Relay 508 at springs 540 completes a circuit for energizing relay 505 by way of release signal lamp 539 and the lower winding of relay 505. Now in case the finder fails to release properly, the dash-pot relay 509 is fully energized to again operate the buzzer 542 and to complete a circuit for illuminating the release signal lamp 539 by way of springs 530, the upper-low resistance winding of relay 505, and through the release signal lamp 539 to ground at springs 540. The attendant upon observing the illumination of lamp 539, knows that some finder has failed to release properly and, therefore, takes the necessary steps to rectify the trouble.

As previously explained, the all-trunks-busy relay 506 is maintained in energized position as long as there is an idle finder-punch-link. As soon as the last-available idle punch-link is taken into use, the circuit extending to the all-trunks-busy relay 506 is opened and the relay accordingly deenergizes to energize relay 507. At springs 533, relay 507 completes a circuit for the all-trunks-busy meter 547, and at springs 532 completes a circuit for operating the delayed meter 546 in case there is a call set up on one of the transmitter lines waiting to seize an idle finder-punch-link. At springs 532, relay 507 completes a circuit for energizing relay 505 from ground by way of springs 519 and 519', of any other st rt relay such as relays 502 and 503, which may be energized because of a waiting call, and by way of springs 532 through the delayed lamp 538 and the lower winding of relay 505 to battery. Relay 505 again completes the circuit for dash-pot relay 509, and in case an idle finder-punch-link becomes available for use before the dash-pot relay 509 is fully operated, no signal or alarm will be operated. However, if this busy condition exists for a certain period of time, the dash-pot relay 509 is fully operated to operate the buzzer 542 and to illuminate the delayed lamp 538 through the upper winding of relay 505 to ground at springs 519.

In case a fuse, such as fuse 525, should blow out, the blown out fuse 525 would complete a circuit from the negative battery bus bar 524 by way of alarm bus 526 and through the winding of relay 504 to ground. Relay 504 immediately operates, and at springs 522 completes a circuit for illuminating the fuse alarm lamp 523 and at springs 521 completes a circuit for operating the alarm buzzer 542. The attendant upon hearing the alarm and observing that the fuse alarm lamp 523 is illumininated, will immediately place a new fuse on the bus bar 524.

Having described the invention what is considered new and is desired to have protected by Letters Patent, will be set forth in the following claims.

What is claimed is:

1. In an accounting system wherein cards are automatically fed through marking machines one at a time to mark the cards with predetermined markings and for thereafter stopping the machines and cards in predetermined positions, card-checking means associated with each machine and operated when the machines are stopped in their predetermined positions for checking the positions of said cards, means for selecting said machines for use, and a chain transfer circuit common to said machines and controlled by each of said card-checking means for rendering selectable only those machines in which the cards are in their predetermined positions.

2. In an accounting system wherein cards are automatically fed through marking machines one at a time to mark the cards with predetermined markings and for thereafter stopping the machines and cards in predetermined positions, means for selecting said machines for use, card-checking means associated with each machine and operated when the machines are stopped in their predetermined positions for rendering selectable only those machines in which the cards are in their predetermined positions, indicating means for each machine, and means controlled by said card-checking means for operating said indicating means to indicate the machines which are non-selectable.

3. In an automatic accounting system wherein a card is automatically fed through a marking machine to mark said card with predetermined markings and for thereafter stopping such card in a predetermined position, means for thereafter selecting said machine for use, and card-checking means then operative to render said machine selectable only in case said card is in its predetermined position.

4. In an automatic accounting system wherein a card is automatically fed through a marking machine to mark said card with predetermined markings and for thereafter stopping such card in a predetermined position, means for thereafter selecting said machine for use, card-checking means then operative to check the position of said card, means controlled by said card-checking means for rendering said machine selectable only in case said card is in its predetermined position, a signal for said machine, and means controlled by said card-checking means for rendering said machine non-selectable in case said card is not in its predetermined position and for operating said signal to indicate that the machine is non-selectable.

5. In an electrically-operated accounting system, the combination with a plurality of cards having coded markings therein designating digits, the code for any one digit including two markings in a single column on said cards, a circuit closer having means for simultaneously preparing a plurality of circuits from the coded markings in said cards, and a switch operated responsive to the operation of said circuit closer to successively close pairs of said prepared circuits in accordance with the double markings in successive columns of said cards.

6. In an electrically-operated accounting system, the combination with a plurality of cards having coded markings therein designating digits, the code for any one digit including two markings in a single column on said cards, a circuit closer having means for simultaneously preparing a plurality of circuits from the coded markings in said cards, a switch operated responsive to the operation of said circuit closer to successively close pairs of said prepared circuits in accordance with the double markings in successive columns of said cards, a marking machine adapted to be operated in accordance with said successively-closed pairs of circuits, and a finder associated with said machine for automatically finding said circuit closer and switch to connect said machine therewith when said circuit closer is operated.

7. In an electrically-operated accounting system, the combination with a plurality of cards having coded markings therein designating digits, the code for any one digit including two markings in a single column on said cards, of a circuit closer having means for simultaneously preparing a plurality of circuits from the coded markings in said cards, a switch operated responsive to the operation of said circuit closer to successively close pairs of said prepared circuits in accordance with the double markings in successive columns of said cards, and means for stopping the successive closure of said circuits in case said switch fails to close a pair of said prepared circuits.

8. In an electrically-operated accounting system, the combination with a plurality of cards having coded perforations therein designating digits, the code for any one digit including two perforations in a single column on said cards, a circuit closer having means for simultaneously preparing a plurality of circuits in accordance with the coded perforations in said cards, a switch operated responsive to the operation of said circuit closer to successively close pairs of said prepared circuits in accordance with the double perforations in successive columns of said cards, means for stopping the successive closure of said circuits in case said switch fails to close a pair of said prepared circuits, and means operated responsive therto for indicating said stoppage.

9. An auditing system comprising a transmitting device, a plurality of marked cards, and a recording machine, an electro-magnetic locking means in said device, a circuit completed responsive to the proper insertion of said cards in said device and the closure thereof for energizing said magnetic locking means to lock said device closed and for initiating the operation of said device, means responsive thereto for automatically operating said device and machine to make a record of the marked information in said cards, means for thereafter opening said device to permit withdrawal of said cards, and means operated responsive to the closure of said device in case one or more cards have been improperly inserted or omitted from the device for preventing the completion of said circuit whereby the device is not locked in its closed position and automatically opens to indicate improper insertion or omission of one or more of the cards.

10. In a transmitting system, a relay group, comprising a plurality of relays, a marking machine connected with said relay group, means for transmitting codes of impulses to energize different combinations of said relays, each code of impulses energizing two of said relays to operate said machine, and contacts on said relays for closing a circuit to operate said machine only in case only two of said relays are energized in response to each code of impulses.

11. In a transmitting system, a relay group comprising a plurality of relays, a marking machine connected with said relay group, means for transmitting successive codes of impulses to energize different combinations of said relays, each code of impulses energizing two of said relays to operate said machine, contacts on said relays for closing a circuit to operate said machine only in case only two of said relays are energized in response to each code of impulses, and means controlled responsive to each operation of said machine for deenergizing the said energized relays and for advancing said transmitting means to transmit the succeeding code of impulses.

12. In an automatic auditing system, a trunk line, a plurality of transmitters on said trunk line, means responsive to the closure of any one of said transmitters for locking such transmitter closed and for seizing said trunk line, means for busying said trunk line responsive to its seizure to prevent any other transmitter seizing said trunk line while busy, means responsive to the closure of a second transmitter for locking said second transmitter closed without seizing said trunk line in case said trunk line is busy, means for opening the first transmitter to remove said busy condition, and means in said second transmitter for seizing said trunk line responsive to the removal of said busy condition.

13. In an automatic auditing system, a plurality of marking machines, a trunk line, a plurality of transmitters on said trunk line, a card having markings therein designating certain data, means responsive to the insertion of said card in one of said transmitters and the closure thereof for connecting said trunk line to an idle one of said machines, means responsive thereto for operating said transmitter to transmit impulses over said trunk line in accordance with the markings in said card, means for operating said machine in accordance with the transmitted impulses, and busying means for preventing a second one of said transmitters from interfering with or seizing said trunk line during the time said trunk line is in use with said first transmitter.

14. In an auditing system, a trunk line, a plurality of transmitters on said trunk line, means responsive to the closure of any one of said transmitters for locking said transmitter closed and for seizing said trunk line, means for busying said trunk line responsive to its seizure to prevent any other transmitter seizing said trunk line while busy, a signal, means responsive to the closure of a second one of said transmitters for locking said second transmitter closed without seizing said trunk line and for operating said signal in case said trunk line is busy, means for opening said first transmitter to remove said busy condition, and means in said second transmitter for effacing said signal, for seizing said trunk line, and for indicating such seizure responsive to the removal of said busy condition.

15. In an accounting system, a plurality of recorders, a plurality of marked cards, a plurality of transmitters adapted for holding said marked cards, a finder switch associated with each of said recorders, and means responsive to the placing of some of said cards in one of said transmitters and its closure for operating an idle one of said finders to find the transmitter in use to connect it to the recorder associated with such finder.

16. In an accounting system, a plurality of recorders, a plurality of marked cards, a plurality of transmitters adapted for holding said marked cards, a finder switch associated with each of said recorders, means responsive to the placing of some of said cards in one of said transmitters and its closure for operating an idle one of said finders to find the transmitter in use to connect it to the recorder associated with such finder, and means in said operated finder operated in case such finder fails to find the calling transmitter for starting a second finder to find the calling transmitter and for releasing the first finder.

17. In an accounting system, a plurality of recorders, a plurality of marked cards, a plurality of transmitters adapted for holding said marked cards, a finder switch associated with each of said recorders, means responsive to the placing of some of said cards in one of said transmitters and its closure for operating an idle one of said finders to find the transmitter in use to connect it to the recorder associated with such finder, a transfer circuit in said operated finder, means in said finder operated in case such finder fails to find the calling transmitter for closing said circuit to start a second finder to find the calling transmitter and for releasing the first finder, and means for maintaining said transfer circuit closed after the release of the first finder.

18. In an accounting system, a plurality of recorders, a plurality of marked cards, a plurality of transmitters adapted for holding said marked cards, a finder switch associated with each of said recorders, means responsive to the placing of some of said cards in one of said transmitters and its closure for operating an idle one of said finders to find the transmitter in use to connect it to the recorder associated with such finder, a transfer circuit in said finder closed responsive to the finder finding said transmitter, means responsive to the placing of some of said cards in a second transmitter and its closure for starting an idle second finder over said transfer circuit to find the second transmitter to connect it to the recorder associated with the second finder, means for releasing said first finder and transmitter, and means for maintaining said transfer circuit closed after the release of said first finder.

19. In an automatic auditing system, a plurality of marking machines, a finder switch having wipers and bank contacts accessible thereto associated with each of said machines, a plurality of transmitters each having trunk lines terminating in the bank contacts of said finder switches, a plurality of cards having markings therein designating certain data, means in one of said transmitters responsive to the insertion of said cards in one of said transmitters and the closure thereof for transmitting impulses over its associated trunk line in accordance with the markings in said card, means responsive to the closure of said one transmitter for operating an idle one of said finders to find the trunk line associated with the transmitter in use and connect it with one of said machines, and means for operating said machine in accordance with the transmitted impulses.

20. In an automatic auditing system, a plurality of marking machines, a finder switch having wipers and bank contacts accessible thereto associated with each of said machines, a plurality of transmitters each having trunk lines terminating in the banks of said finder switches, said trunk lines terminating and multiplied in the banks of said finder switches to give each finder first choice to a different one of said trunk lines, a plurality of cards having markings therein designating certain data, means in said transmitters responsive to the insertion of one of said cards in one of said transmitters and the closure thereof for transmitting impulses over its associated trunk line in accordance with the markings in said card, and means responsive to the closure of said one transmitter for operating the finder in which the transmitter trunk line in use appears as first choice to find such trunk line and connect it with one of said machines.

21. In an automatic auditing system, a plurality of perforating machines, a finder switch having wipers and bank contacts accessible thereto associated with each of said machines, a plurality of transmitters each having trunk lines terminating in the banks of said finder switches, said trunk lines terminating and multiplied in the banks of said finder switches to give each finder first choice to a different one of said trunk lines, a plurality of cards having perforations therein designating certain data, means in said transmitters responsive to the insertion of one of said cards in one of said transmitters and the closure thereof for transmitting impulses over its associated trunk line in accordance with the perforations in said card, means responsive to the closure of said one transmitter for operating the finder in which the transmitter trunk line in use appears as first choice to find such trunk line and connect it with one of said machines, and means for operating said machine in accordance with the transmitted impulses.

22. In an automatic auditing system, a plurality of perforating machines, a finder switch having wipers and bank contacts accessible thereto associated with each of said machines, a plurality of transmitters each having trunk lines terminating in the banks of said finder switches, said trunk lines terminating and multiplied in the banks of said finder switches to give each finder first choice to a different one of said trunk lines, a plurality of cards having perforations therein designating certain data, means in said transmitters responsive to the insertion of one of said cards in one of said transmitters and the closure thereof for transmitting impulses over its associated trunk line in accordance with the perforations in said card, means responsive to the closure of said one transmitter for operating the finder in which the transmitter trunk line in use appears as first choice to find such trunk line and connect it with one of said machines, means for operating said machine in accordance with the transmitted impulses, and a transfer circuit in said first choice finder switch for operating a second choice finder switch to find the calling transmitter trunk line and connect it to a second machine in case said first choice finder switch is busy.

23. In an accounting system, two recorders, two transmitters, a finder switch associated with each recorder, a trunk line for each transmitter, the first trunk line terminating in the banks of the first finder as first choice and in the banks of the second finder as second choice, the second trunk line terminating in the banks of the first finder as second choice and in the banks of the second finder as first choice, means responsive to the closure of said first transmitter for locking said transmitter closed and for operating said first finder, if idle, to find said first trunk line to connect the first transmitter to the first recorder, and for operatng said second finder in case said first finder is busy to find said first trunk line to connect the first transmitter to the second recorder, and means responsive to the completion of said connection for operating said first transmitter and the connected recorder.

24. In a transmitting system, a relay group comprising a plurality of oppositely poled pairs of polarized relays, a conductor extending to each pair of relays, means for energizing the first relay of each pair when positive battery is connected to its corresponding conductor, means for energizing the second relay of each pair when negative battery is connected to its corresponding conductor, means for transmitting codes of impulses over any two of said conductors to energize any two of said relays in different combinations, each code of impulses being either a negative or a positive battery impulse over only two of said conductors, and operating circuits completed in case only two of said relays at a time in different pairs are operated responsive to each code.

25. In a transmitting system, a relay group comprising a plurality of relays, a marking machine for marking cards connected with said relay group, means for transmitting codes of impulses to energize different combinations of said relays, each code of impulses energizing two of said relays to operate said machine, a circuit for operating said machine, contacts on said relays for completing said circuit only in case two of said relays are energized in response to each code of impulses, and means operative in case of failure to close said circuit for sounding an alarm.

26. In an accounting system, a plurality of cards having markings corresponding to predetermined data, a transmitter adapted for holding said marked cards, a marking machine remote from said transmitter, means responsive to the insertion of said cards in said transmitter and the closure thereof for connecting said transmitter with said machine, means responsive to said connection for operating said machine to mark a single card in accordance with the markings in said plurality of cards, a printing device in said transmitter, and means for operating said device to print the date on one of said plurality of cards responsive to said machine completing its marking operations.

27. In an accounting system, a marking machine, a plurality of cards having markings of predetermined data, a transmitter adapted for holding said marked cards, means for connecting said transmitter with said machine, means responsive to said connection for operating said machine to mark a single card in accordance with the markings in said plurality of cards, and a timing device associated with said machine and started in operation responsive to said connection for sounding an alarm within a predetermined time in case said machine fails to complete its marking operations.

28. In an accounting system wherein cards are automatically fed through a marking machine one at a time and partially marked by controlling means associated with said machine, means for automatically stopping each card in a certain position after it has been partially marked, and means located at a remote point from said machine for automatically operating said machine to mark the remainder of each card with predetermined data only in case said cards have been stopped in said certain position.

29. An auditing system, comprising a transmitter, a plurality of perforated cards and a recording machine, levers in said transmitter, a movable plate in said transmitter having holes therein for each of said levers, said levers operated in alinement with their respective holes responsive to the proper insertion of said cards in said transmitter to permit movement of said plate when said transmitter is closed, a circuit completed responsive to the closure of said transmitter and the movement of said plate for initiating the operation of said transmitter, and means responsive thereto for automatically operating said machine to make a record in accordance with the perforated information in said cards.

30. An auditing system, comprising a transmitter, a plurality of perforated cards, and a recording machine, levers in said transmitter, a movable plate in said transmitter having holes therein for each of said levers, said levers operated in alinement with their respective holes responsive to the proper insertion of said cards in said transmitter to permit movement of said plate when said transmitter is closed, and any one of said levers preventing the operation of said plate in case one or more of said cards have been improperly inserted or omitted from said transmitter when the same is closed, a circuit completed responsive to the closure of said transmitter and the movement of said plate for locking the transmitter closed and for initiating the operation of said transmitter, means responsive thereto for automatically operating said transmitter and machine to make a record of the perforated information in said cards, and means for thereafter automatically opening said transmitter to permit withdrawal of said cards.

31. In an accounting system, a circuit closing device including a step-by-step transmitting switch, a plurality of electric circuits leading from said transmitter, a plurality of contacts for closing said circuits, a plurality of cards having coded markings therein designating digits, each respective digit including two markings located in different positions on said cards, means simultaneously controlled by two of said markings in one of said cards for simultaneously selecting two of said contacts to close their associated circuits in accordance with a digit, means controlled by the closure of said pair of circuits for advancing said switch one step, means controlled by the advance of said switch for causing another pair of markings in said card to select the same or another pair of said contacts to close their associated circuits to operate the switch another step, and means for stopping the step-by-step advance of said switch in case said contacts encounter only one of said markings or more than two markings.

32. In an accounting system, a relay group comprising a plurality of relays, a marking machine connected to said relay group, a plurality of cards having markings in each of their respective columns, a transmitter for holding said cards and for transmitting coded impulses in accordance with the markings in said cards to energize said relays in different combinations, each marking causing one of said relays to energize, contacts on said relays for closing a circuit to operate said machine only in case only two of said relays are energized in response to each coded impulse, means operated responsive to each operation of said machine for deenergizing said operated relays to open said circuit and for advancing said transmitter to transmit the succeeding coded impulse as determined by the succeeding markings in said cards, a signal, means for preventing the closure of said circuit to prevent the operation of said machine in case only one or more than two of said relays are operated by only one marking or more than two markings, respectively, on the next coded impulse, and means for operating said signal a predetermined time after the failure of the machine to operate.

33. In an automatic auditing system, a marking machine, a finder switch associated with said machine having wipers and bank contacts, a trunk line terminating in said finder banks, a plurality of transmitters on said trunk line, a plurality of cards having markings therein designating certain data, means in said transmitters responsive to the insertion of said cards in one of said transmitters and the closure thereof for transmitting impulses over said trunk line in accordance with the markings in said cards, means responsive to the closures of said one transmitter for operating said finder to find the trunk line and connect it with said machine, means for operating said machine in accordance with the transmitted impulses, and means for preventing a second one of said transmitters from seizing said trunk line during the time the trunk line is in use.

34. In an automatic auditing system, a marking machine, a finder switch associated with said machine having wipers and bank contacts, a trunk line terminating in said finder banks, a plurality of transmitters on said trunk line, a plurality of cards having markings therein designating certain data, means in said transmitters responsive to the insertion of said cards in one of said transmitters and the closure thereof for transmitting impulses over said trunk line in accordance with the markings in said cards, means responsive to the closures of said one transmitter for operating said finder to find the trunk line and connect it with said machine, means for operating said machine in accordance with the transmitted impulses, means for preventing a second one of said transmitters from seizing said trunk line during the time the trunk line is in use, a signal in said second transmitter, and means for operating said signal responsive to the closure of said second transmitter in case said trunk line at such time is in use by another transmitter.

35. In an automatic auditing system, a marking machine, a finder switch associated with said machine having wipers and bank contacts, a trunk line terminating in said finder banks, a plurality of transmitters on said trunk line, a plurality of cards having markings therein designating certain data, means in said transmitters responsive to the insertion of said cards in one of said transmitters and the closure thereof for transmitting impulses over said trunk line in accordance with the markings in said cards, means responsive to the closures of said one transmitter for operating said finder to find the trunk line and connect it with said machine, means for operating said machine in accordance with the transmitted impulses, means for preventing a second one of said transmitters from seizing said trunk line during the time the trunk line is in use, a signal in said second transmitter, means for operating said signal responsive to the closure of said second transmitter in case said trunk line at such time is in use by another transmitter, and a second signal in said second transmitter operated when said second transmitter seizes said trunk line to indicate such seizure.

36. In an accounting system, a marking machine, a marking position in said machine, means for automatically feeding a card to said machine and for stopping the card in marking position, and an electromagnetically operated and circuit controlling card-check means associated with said marking position for determining when a card is in marking position.

37. In an accounting system wherein a card is automatically fed to a marking machine and stopped in marking position, card-check means associated with the marking position of said machine, means for automatically selecting said machine for use, and a circuit controlled by said card-check means for rendering said machine selectable only in case said card is in marking position.

38. In a transmitting system, a card having coded markings therein designating characters, the code for any one character including two markings in a single column on said card, sensing means for simultaneously sensing a plurality of markings in said card, and means operated responsive to the operation of said sensing means to successively pick up pairs of said sensed markings in accordance with the double markings in successive columns of said card.

39. In a transmitting system comprising a transmitting device and a marked card, an electromagnetic locking means in said device, a circuit completed responsive to the proper insertion of said card in said device and the closure thereof for energizing said magnetic locking means to lock said device closed, means responsive thereto for automatically operating said device to transmit data in accordance with the markings in said card, means for thereafter automatically opening said device to permit withdrawal of said card, and means operated responsive to the closure of said device in case said card has been improperly inserted or omitted from the device for preventing the completion of said circuit whereby the device is not locked in its closed position and automatically opens to indicate improper insertion or omission of said card.

40. In a transmitting system, a relay group comprising a plurality of pairs of relays, a marking machine connected with said relay group, means for transmitting codes of impulses to energize different combinations of said relays, each code energizing only two of said relays, circuits for operating said machine, and contacts controlled by said relays for completing said circuits only in case only two of said relays are energized in different pairs in response to each code.

41. In an automatic auditing system, a trunk line, a plurality of transmitters on said trunk line, means responsive to the closure of any one of said transmitters for locking said transmitter closed and for seizing said trunk line, means for busying said trunk line responsive to its seizure to prevent any other transmitter seizing said trunk line while busy, and means responsive to the closure of a second transmitter on said trunk line for locking said second transmitter closed without seizing said trunk line or interfering therewith in case said trunk line is busy.

42. In an accounting system, a card having markings corresponding to predetermined data, a transmitter for holding said marked card, a marking machine, means responsive to the insertion of said card in said transmitter and the closure thereof for automatically connecting said transmitter with said machine, means responsive to said connection for automatically operating said machine to mark another card in accordance with the data markings in said first card, a marking device in said transmitter, and means for automatically operating said marking device to mark data on said first card responsive to said machine completing its marking operations.

43. In an accounting system, a marking machine, a card having markings of predetermined data, a transmitter for holding said marked card, means for connecting said transmitter with said machine, means responsive to said connection for operating said machine to mark another card in accordance with the markings in said first card, and a timing device associated with said machine for sounding an alarm in case said machine fails to complete its marking operations.

44. In an accounting system, a circuit closing device including a rotating transmitting switch for rotating one step on each operation thereof, a plurality of electric circuits leading from said transmitting switch, a plurality of contacts for closing said circuits, a card having coded markings therein designating digits, each respective digit including two markings in different positions on said card, means simultaneously controlled by two of said markings in said card for simultaneously selecting two of said contacts to close their associated circuits in accordance with a digit, means controlled by the closure of said pair of circuits for operating said switch one step, and means controlled by the advance of said switch for causing another pair of markings in said card to select another pair of said contacts to close their associated circuits to operate the switch another step.

45. In a transmitting system, a card having coded markings therein designating characters, the code for any one character including a plurality of markings in a single column on said card, sensing means for simultaneously sensing a plurality of markings in a plurality of columns in said card, and means operated responsive to the operation of said sensing means to simultaneously pick up all the sensed coded markings of a single coded character in only one column at a time and to successively pick up the sensed coded markings of successive coded characters in successive columns of said card.

46. In a transmitting system comprising a transmitting device and a marked card having markings corresponding to predetermined data, an electromagnetic locking means in said device, a circuit completed responsive to the insertion of said card in said device and the closure thereof for energizing said magnetic locking means to lock said device closed, means responsive thereto for automatically operating said device to transmit data in accordance with the markings in said card, means for thereafter automatically opening said circuit to unlock said magnetic locking means to open said device to permit withdrawal of said card in response to said machine completing its transmitting operations, said circuit remaining closed and said device locked in case said device fails to complete its transmitting operations, and a key controlled lock switch operable only by authorized persons having a key for unlocking the same for manually opening said circuit to unlock said magnetic locking means to open said device.

47. In a recording system, a transmitter for holding marked cards having markings corresponding to predetermined data, a marking machine, means responsive to the insertion of one of said cards in said transmitter and the closure thereof for automatically connecting said transmitter with said machine, means responsive to said connection and controlled by the data markings in the card in said transmitter for operating said marking machine to mark another card with data markings corresponding to the data markings in the card in the transmitter, a marking device in said transmitter, and means for operating said marking device to mark data on the said card in the transmitter responsive to said marking machine completing its marking operations.

48. In a recording system, a transmitter for holding marked cards having markings corresponding to predetermined data, a marking machine, means responsive to the insertion of one of said cards in said transmitter and the closure thereof for automatically connecting said transmitter with said machine, means responsive to said connection and controlled by the data markings in the card in said transmitter for operating said marking machine to mark another card with data markings corresponding to the data markings in the card in the transmitter, a marking device in said transmitter, means for operating said marking device to mark data on the said card in the transmitter responsive to said marking machine completing its marking operations, and means controlled by the operation of said marking device for automatically opening the transmitter to permit withdrawal of the said card from the transmitter.

49. In a recording system, a plurality of marking machines, a transmitter adapted for holding marked cards having markings of predetermined data therein, switching means automatically operated in response to the insertion of one of said cards in said transmitter and to the closure of said transmitter for connecting said transmitter to an idle one of said marking machines, means responsive to said connection and controlled by the data markings in the card in said transmitter for operating said machine to mark another card with data markings in accordance with the data markings in the card in said transmitter, and an alarm device associated with said machine for operating an alarm in case said machine fails to complete its marking operations.

MARTIN L. NELSON.